United States Patent
Lee et al.

(10) Patent No.: US 12,380,045 B2
(45) Date of Patent: Aug. 5, 2025

(54) SYSTEM AND METHOD FOR FACILITATING DATA COMMUNICATION

(71) Applicant: Razer (Asia-Pacific) Pte. Ltd., Singapore (SG)

(72) Inventors: Kah Yong Lee, Singapore (SG); Jian Yao Lien, Singapore (SG)

(73) Assignee: Razer (Asia-Pacific) Pte. Ltd., Singapore (SG)

( * ) Notice: Subject to any disclaimer, the term of this patent is extended or adjusted under 35 U.S.C. 154(b) by 15 days.

(21) Appl. No.: 18/451,677

(22) Filed: Aug. 17, 2023

(65) Prior Publication Data

US 2024/0004817 A1 Jan. 4, 2024

Related U.S. Application Data

(63) Continuation-in-part of application No. PCT/SG2021/050728, filed on Nov. 26, 2021.
(Continued)

(51) Int. Cl.
*G06F 13/38* (2006.01)
*G06F 13/42* (2006.01)

(52) U.S. Cl.
CPC ........ *G06F 13/382* (2013.01); *G06F 13/4282* (2013.01); *G06F 2213/0042* (2013.01)

(58) Field of Classification Search
CPC ............... G06F 13/382; G06F 13/4282; G06F 2213/0042
See application file for complete search history.

(56) References Cited

U.S. PATENT DOCUMENTS

| 6,745,360 B1 | 6/2004 | Srinivas et al. |
| 7,174,386 B2 | 2/2007 | Cunningham et al. |

(Continued)

FOREIGN PATENT DOCUMENTS

| EP | 3437226 B1 | 7/2021 |
| JP | 2005033412 A | 2/2005 |
| WO | 2005101731 A2 | 10/2005 |

OTHER PUBLICATIONS

"Razer Viper 8KHz Absolute Control. Elevated" Ambidextrous Esports Gaming Mouse—Razer Viper 8KHz, 2021, 13 pages, Retrieved from URL: https://www.razer.com/gaming/mice/razer-viper-8khz.

(Continued)

*Primary Examiner* — Henry Tsai
*Assistant Examiner* — Harry Z Wang
(74) *Attorney, Agent, or Firm* — Polsinelli PC

(57) ABSTRACT

According to various embodiments, a system for facilitating a data communication is provided. The system may comprise a human interface device; and a receiver device couplable to a host device and communicatively connectable to the human interface device. The human interface device is configured to generate input data for a user input on the human interface device, generate control information associated with the input data, and transmit the input data and the control information to the receiver device. The control information indicates whether an acknowledgement of receipt of the input data is required. The receiver device is configured to receive the input data and the control information from the human interface device and transmit the input data to the host device, and the receiver device is further configured to transmit an acknowledgement packet to the human interface device when the control information received from the human interface device indicates that an acknowledgement of receipt of the input data is required, (Continued)

and perform a background task when the control information received from the human interface device indicates that an acknowledgement of receipt of the input data is not required.

31 Claims, 24 Drawing Sheets

Related U.S. Application Data

(60) Provisional application No. 63/371,906, filed on Aug. 19, 2022.

(56) References Cited

U.S. PATENT DOCUMENTS

| | | | |
|---|---|---|---|
| 7,574,531 B2 | 8/2009 | Bennett et al. | |
| 7,631,240 B2 | 12/2009 | Frederiks et al. | |
| 7,697,561 B2 | 4/2010 | Nishibayashi et al. | |
| 8,160,002 B2 | 4/2012 | Rajkotia et al. | |
| 8,207,937 B2 | 6/2012 | Ambuehl et al. | |
| 8,463,937 B2 | 6/2013 | Bush | |
| 8,519,954 B2 * | 8/2013 | Ambuehl | H04B 7/265 |
| | | | 345/169 |
| 10,251,202 B2 | 4/2019 | Minamiyama et al. | |
| 11,088,785 B2 | 8/2021 | Vaidya et al. | |
| 2004/0025099 A1 | 2/2004 | Aikawa et al. | |
| 2006/0035590 A1 * | 2/2006 | Morris | H04W 52/28 |
| | | | 710/1 |
| 2007/0019771 A1 * | 1/2007 | Ambuehl | H04W 52/0254 |
| | | | 375/372 |
| 2009/0006699 A1 | 1/2009 | Rofougaran | |
| 2009/0296603 A1 * | 12/2009 | Hamadi | H04W 88/06 |
| | | | 370/254 |
| 2013/0318762 A1 | 12/2013 | Knoll | |
| 2014/0029587 A1 | 1/2014 | Hirata et al. | |
| 2019/0286579 A1 * | 9/2019 | Lee | G06F 13/38 |
| 2020/0019517 A1 | 1/2020 | Chazot et al. | |
| 2020/0045714 A1 | 2/2020 | Ohta et al. | |
| 2020/0133891 A1 * | 4/2020 | Chazot | H04L 1/0053 |
| 2020/0220611 A1 * | 7/2020 | Syed | G06F 21/606 |
| 2021/0056058 A1 * | 2/2021 | Lee | G06F 13/4221 |
| 2021/0318762 A1 * | 10/2021 | Lee | G06F 3/033 |
| 2021/0374076 A1 * | 12/2021 | Chou | G06F 3/023 |

OTHER PUBLICATIONS

European Search Report; filed Dec. 19, 2024; Application # 21965813.5.

* cited by examiner

SYSTEM AND METHOD FOR FACILITATING DATA COMMUNICATION

CROSS-REFERENCE TO RELATED APPLICATIONS

This application is a Continuation-In-Part of International Application No. PCT/SG2021/050728 filed Nov. 26, 2021. This application also claims priority to U.S. Provisional Patent Application No. 63/371,906 filed Aug. 19, 2022. The disclosures of both applications are incorporated herein by reference in their entirety.

TECHNICAL FIELD

Various embodiments relate to a system and a method for facilitating a data communication.

BACKGROUND

A computing device such as a desktop computer, a laptop computer, a tablet computer, etc. may interact with at least one human interface device such as a mouse, a keyboard, a key pad, etc. to allow a user to control or operate the computing device. The human interface device may be physically separated from the computing device (hereinafter, referred to as a "host device"). Such human interface device may beneficially increase flexibility of interactions between the user and the host device.

A wireless communication link may be implemented to support a data communication between the human interface device and a receiver device, such as a dongle, which is detachably couplable to the host device. The human interface device may use the communication link to transmit input data for the user's input to the host device via the receiver device.

There exists a need for an improved system and method for facilitating a data communication.

SUMMARY

According to various embodiments, a system for facilitating a data communication is provided. The system may include: a human interface device; a receiver device couplable to a host device and communicatively connectable to the human interface device, wherein the human interface device is configured to generate input data for a user input on the human interface device, generate control information associated with the input data, and transmit the input data and the control information to the receiver device, wherein the control information indicates whether an acknowledgement of receipt of the input data is required, and wherein the receiver device is configured to receive the input data and the control information from the human interface device and transmit the input data to the host device, and the receiver device is further configured to transmit an acknowledgement packet to the human interface device when the control information received from the human interface device indicates that an acknowledgement of receipt of the input data is required, and perform a background task when the control information received from the human interface device indicates that an acknowledgement of receipt of the input data is not required.

According to various embodiments, a method for facilitating a data communication is provided. The method may include: generating, by a human interface device, input data for a user input on the human interface device; generating, by the human interface device, control information associated with the input data, wherein the control information indicates whether an acknowledgement of receipt of the input data is required; transmitting the input data and the control information from the human interface device to a receiver device, wherein the receiver device is communicatively connected to the human interface device; and transmitting an acknowledgement packet from the receiver device to the human interface device, when the control information received from the human interface device indicates that an acknowledgement of receipt of the input data is required, and performing, by the receiver device, a background task, when the control information received from the human interface device indicates that an acknowledgement of receipt of the input data is not required.

Additional features for advantageous embodiments are provided in the dependent claims.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various embodiments are described with reference to the following drawings, in which.

DESCRIPTION

Embodiments described below in context of the method are analogously valid for the system, and vice versa. Furthermore, it will be understood that the embodiments described below may be combined, for example, a part of one embodiment may be combined with a part of another embodiment.

It will be understood that any property described herein for a specific device may also hold for any device described herein. Furthermore, it will be understood that for any device described herein, not necessarily all the components described must be enclosed in the device, but only some (but not all) components may be enclosed.

It should be understood that the terms "on", "over", "top", "bottom", "down", "side", "back", "left", "right", "front", "lateral", "side", "up", "down" etc., when used in the following description are used for convenience and to aid understanding of relative positions or directions, and not intended to limit the orientation of any device, structure or any part of any device or structure. In addition, the singular terms "a", "an", and "the" include plural references unless context clearly indicates otherwise. Similarly, the word "or" is intended to include "and" unless the context clearly indicates otherwise.

The term "coupled" (or "connected") herein may be understood as electrically coupled or as mechanically coupled, for example attached or fixed, or just in contact without any fixation, and it will be understood that both direct coupling or indirect coupling (in other words: coupling without direct contact) may be provided.

In order that the disclosure may be readily understood and put into practical effect, various embodiments will now be described by way of examples and not limitations, and with reference to the figures.

Figure 1:
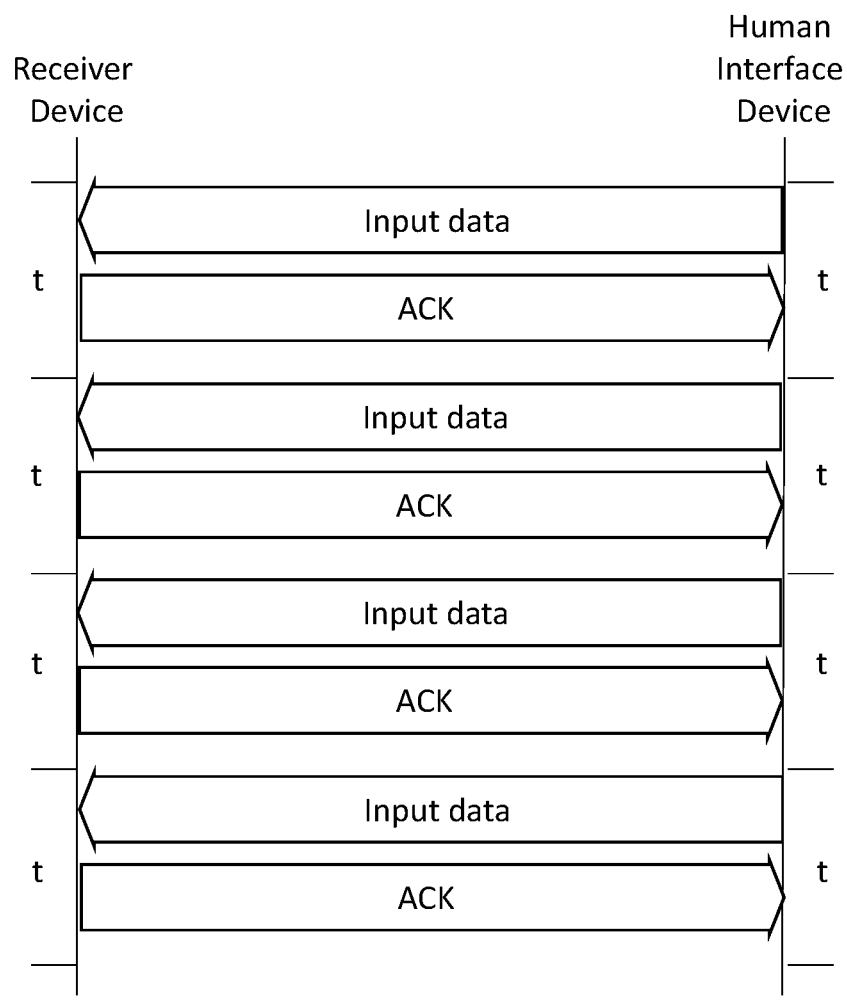
FIG. 1 shows a sequence diagram showing interactions between a receiver device and a human interface device.

FIG. 1 shows a sequence diagram showing interactions between a receiver device and a human interface device. As shown in FIG. 1, the human interface device may transmit the input data to the receiver device. The receiver device may receive the input data from the human interface device and transmit an acknowledgement packet (indicated as "ACK" in FIG. 1) for the input data to the human interface device. For example, the human interface device may transmit the input data to the receiver device at a predetermined time interval t (for example, 1 ms) whenever there is a change in the user's input.

Figure 2:
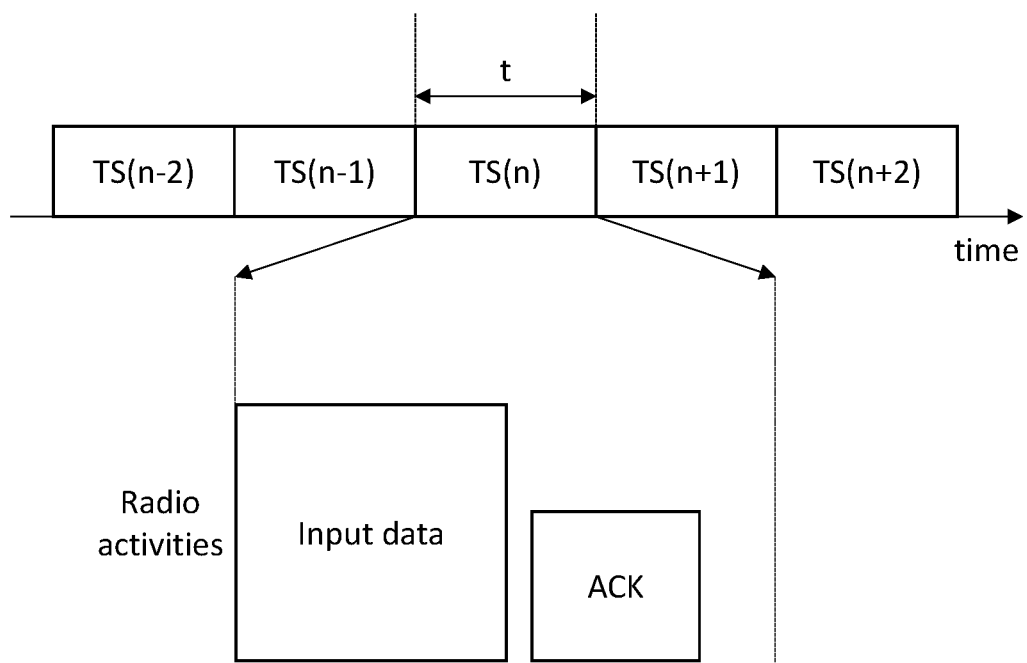
FIG. 2 shows an example time slot configuration showing interactions between a receiver device and a human interface device.

FIG. 2 shows an example time slot configuration depicting interactions between the receiver device and the human interface device. As shown in FIG. 2, in each time slot (for example, TS(n)), the human interface device may transmit the input data to the receiver device. The receiver device may receive the input data from the human interface device and transmit the acknowledgement packet (indicated as "ACK" in FIG. 2) for the input data to the human interface device.

Figure 3:
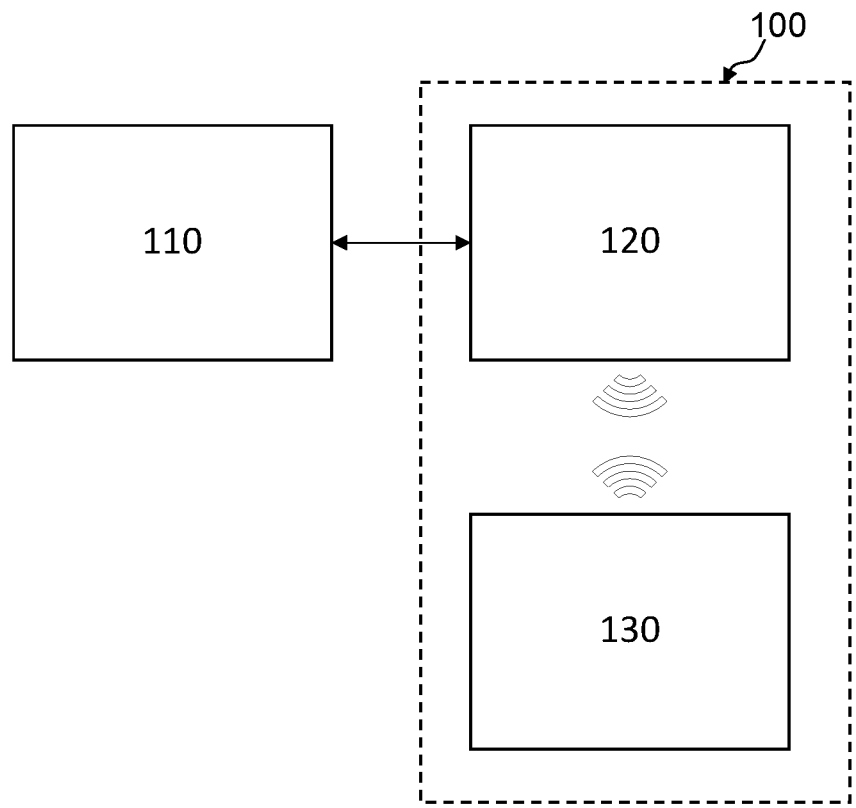
FIG. 3 shows a block diagram of a system according to various embodiments.

FIG. 3 shows a block diagram of a system 100 according to various embodiments.

As shown in FIG. 3, the system 100 may include a receiver device 120 and a human interface device 130 (also referred to as an "HID"). The receiver device 120 may be couplable to a host device 110. The host device 110 may be a computing device configured to store and process data according to instructions. The host device 110 may include, but not be limited to, a mobile phone, a tablet computer, a laptop computer, a desktop computer, a head-mounted display and a smart watch. The host device 110 may include an input/output interface (also referred to as an "I/O interface") (not shown). The I/O interface may be configured to allow the host device 110 to communicate with an external device coupled to the host device 110, for example, the receiver device 120, to transmit and/or receive a signal.

The human interface device 130 may be an electronic device which is used by a user and takes an input from the user to control and/or operate the host device 110. The human interface device 130 may include, but not be limited to, a mouse, a keyboard, a key pad, a joystick, a touch pad, a trackball, and a pointing stick. The human interface device 130 may generate input data for the user input on the human interface device 130, for example, generate corresponding input data that is pre-programmed in response to the user input on the human interface device 130. In an example, the user presses or touches one or more buttons, one or more keys, or any combination thereof, and the human interface device 130 may generate the input data for such user input. As another example, the user scrolls a wheel of the human interface device 130, and the human interface device 130 may generate the input data for such user input. In some embodiments, the human interface device 130 may include a circuitry configured to convert the user input into a proper form of the input data.

In some embodiments, the human interface device 130 may be physically separated from the host device 110. In some embodiments, the human interface device 130 may be a wireless human interface device using a wireless communication link. The human interface device 130 may include a communication module (not shown) operable to transmit the input data to the receiver device 120 (as will be described below). The human interface device 130 may use the wireless communication link to transmit the input data to the receiver device 120. For example, the wireless communication link may include, but not be limited to a radio frequency (RF) radiation link and an infra-red radiation link. In some embodiments, the human interface device 130 may use a Human Interface Device (HID) protocol over the communication link. Although not shown, in some other embodiments, the human interface device 130 is configured to be connectable to the host device 110 via a wired link, for example, using an electrical cable.

The receiver device 120 may be configured to be couplable to the host device 110, for example, detachably, and connectable to the human interface device 130, for example, wirelessly. In some embodiments, the receiver device 120 may be detachably couplable to a port (not shown) of the host device 110. The receiver device 120 may be operable to communicatively connect the human interface device 130 with the host device 110. In some embodiments, the receiver device 120 may use the wireless communication link to receive the input data from the human interface device 130. For example, the receiver device 120 may be a USB dongle including a USB connector at one end, and the port of the host device 110 may be a USB port compatible with the USB connector. The receiver device 120 may provide wireless connection functionalities between the host device 110 and the human interface device 130 while the USB connector of the receiver device 120 is plugged into the USB port of the host device 110. The USB connector of the USB dongle and the USB port of the host device 110 may, for example, be a USB-A connector and a USB-A port, respectively, but are not limited thereto.

In some embodiments, the human interface device 130 may generate the input data for the user input on the human interface device 130. In some embodiments, the human interface device 130 may generate control information associated with the input data. The control information may indicate whether an acknowledgement of receipt of the input data is required. For example, the human interface device 130 may decide whether an acknowledgement of receipt of the input data is required in relation to importance of the input data/the user input, and generate the control information according to the decision. The human interface device 130 may transmit the input data and the control information to the receiver device 120. In some embodiments, the receiver device 120 may receive the input data and the control information from the human interface device 130.

In some other embodiments, the control information may not necessarily be generated in relation with the input data. For example, the control information may be generated in relation with other information such as battery status information and/or DPI (dots per inch) setting information. As an example, the human interface device 130 may generate the control information in relation with the battery status information, and transmit the control information with the input data to the receiver device 120.

In some embodiments, the receiver device 120 may transmit the input data to the host device 110. The host device 110 may receive the input data from the receiver device 120. In some other embodiments, the receiver device 120 may transmit the input data and the control information to the host device 110. The host device 110 may receive the input data and the control information from the receiver device 120.

In some embodiments, the receiver device 120 may check the control information received from the human interface device 130. If the control information received from the human interface device 130 indicates that an acknowledgement of receipt of the input data is required, the receiver device 120 may transmit an acknowledgement packet to the human interface device 130. If the control information received from the human interface device 130 indicates that an acknowledgement of receipt of the input data is not required, the receiver device 120 may perform a background task, for example, establishing a new wireless connection for at least one of the receiver device 120 and the human interface device 130.

In some embodiments, the host device 110 may generate control data for controlling the human interface device 130, and transmit the control data to the receiver device 120. If the control information received from the human interface device 130 indicates that an acknowledgement of receipt of the input data is required, the receiver device 120 may transmit the control data with the acknowledgement packet to the human interface device 130 to control the human interface device 130.

In some embodiments, the human interface device 130 may include a plurality of light sources (not shown) capable of selectively producing a plurality of lighting colours. The plurality of light sources may be housed in the human interface device 130. The plurality of light sources may be capable of emitting light. In some embodiments, each light source of the plurality of light sources may be capable of selectively producing the plurality of lighting colours. Each light source of the plurality of light sources may produce the light in various lighting colours, for example, including red, green, blue, or any combinations thereof. For example, each light source of the plurality of light sources may include an RGB LED (red-green-blue light emitting diode).

In some embodiments, the host device 110 may generate the control data including data for controlling each light source to produce at least one predetermined lighting colour among the plurality of lighting colours (for example, chroma data about a lighting profile). The host device 110 may transmit the control data including the data about the lighting profile to the receiver device 120. If the control information received from the human interface device 130 indicates that an acknowledgement of receipt of the input data is required, the receiver device 120 may transmit the control data including the data about the lighting profile with the acknowledgement packet to the human interface device 130 to control each light source of the human interface device 130. Each light source of the human interface device 130 may produce at least one predetermined lighting colour among the plurality of lighting colours based on the received lighting profile.

In some embodiments, the human interface device 130 may be configured to transmit the input data and the control information to the receiver device 120 at a predetermined time interval. Accordingly, the receiver device 120 may transmit the control data with the acknowledgement packet to the human interface device 130 at the predetermined time interval. For example, the predetermined time interval may be 1000 µs, 500 µs, 250 µs or 125 µs, and a polling rate of the human interface device 130 may be 1000 Hz, 2000 Hz, 4000 Hz or 8000 Hz.

In some embodiments, if a size of the control data exceeds a predetermined size, the receiver device 120 may inform the human interface device 130 of pending control data. The human interface device 130 may then extend the predetermined time interval, so as to enable the receiver device 120 to transmit the control data exceeding the predetermined size to the human interface device 130 during the extended time interval. For example, the extended time interval may be twice, four times or eight times the predetermined time interval. As an example, the extended time interval may be 250 µs, 500 µs, 1000 µs if the predetermined time interval may be 125 µs. In some embodiments, the human interface device 130 may return (e.g. revert) the extended time interval to the predetermined time interval, after receiving the control data exceeding the predetermined size from the receiver device 120.

In some embodiments, the receiver device 120 may split the control data into a plurality of groups of the control data. For example, if a size of the control data exceeds a predetermined size, the receiver device 120 may split the control data into the plurality of groups of the control data, based on the size of the control data. The receiver device 120 may sequentially transmit each group of the plurality of groups of the control data to the human interface device 130. Each group of the plurality of groups of the control data may have an indicator showing a sequence thereof in connection with the control data being split. In some embodiments, after receiving the plurality of groups of the control data, the human interface device 130 may consolidate the plurality of groups of the control data, and control one or more components of the human interface device 130 based on the control data.

In some embodiments, if the control information received from the human interface device 130 indicates that an acknowledgement of receipt of the input data is not required, the receiver device 120 may perform one of scanning one or more available channels and broadcasting a signal about an identity of the receiver device 120. In some embodiments, the receiver device 120 may alternatively perform scanning the one or more available channels and broadcasting the signal about the identity of the receiver device 120.

In some embodiments, the receiver device 120 may perform scanning the one or more available channels in a vicinity of the receiver device 120. As an example, the receiver device 120 may periodically scan the one or more available channels. For example, the receiver device 120 may scan one or more less busy channels. In some embodiments, the receiver device 120 may detect radio energy of the one or more available channels, for example RF channels. The receiver device 120 may compute an average of the detected radio energy. The receiver device 120 may then select an RF channel based on the computed average. For example, the receiver device 120 may select the RF channel with lower energy (which represent the less busy channel) than an RF channel that the receiver device 120 is currently using.

In some embodiments, the receiver device 120 may detect the radio energy of the RF channels, using a method of RSSI (Received Signal Strength Indicator). In some embodiments, the RF channels may be programmed, and then the receiver device 120 may measure and evaluate a radio signal level for each RF channel as RSSI. Thereafter, the receiver device 120 may compute a moving average of each RF channel's RSSI, and select the RF channel with lower average value.

In some embodiments, the receiver device 120 may broadcast the signal about the identity of the receiver device 120 to a vicinity of the receiver device 120. In some embodiments, the human interface device 130 may pair to more than one receiver device, and/or the receiver device 120 may pair to more than one human interface device. In some embodiments, the system 100 may further include another receiver device 140 (see FIG. 9) and/or another human interface device 150 (see FIG. 9). The another receiver device 140 and/or the another human interface device 150 may detect the receiver device 120 by the broadcasted signal. The human interface device 130 may switch to another receiver device 140 (also referred to as a "primary (main) receiver device") detected in the vicinity, from the receiver device 120 (also referred to as a "secondary receiver device"). The another human interface device 150 (also referred to as a "primary (main) human interface device") may take control over the human interface device 130 (also referred to as a "secondary human interface device").

In some embodiments, the system 100 may further include the another receiver device 140. The another receiver device 140 may detect the receiver device 120 by the broadcasted signal. The another receiver device 140 may transmit a command for disconnecting the receiver device 120 from the human interface device 130 to the receiver device 120. The receiver device 120 may receive the command from the another receiver device 140, and disconnect from the human interface device 130. In some embodiments, after the receiver device 120 disconnects from the human interface device 130, the human interface device 130 may establish the new wireless connection with the another receiver device 140.

In some embodiments, the system 100 may further include the another human interface device 150. The another human interface device 150 may detect the receiver device 120 by the broadcasted signal. The another human interface device 150 may transmit a command for a request for a connection to the receiver device 120. The receiver device 120 may receive the command from the another human interface device 150, and disconnect from the human interface device 130. In some embodiments, after the receiver device 120 disconnects from the human interface device 130, the receiver device 120 may establish the new wireless connection with the another human interface device 150.

In some embodiments, if the control information received from the human interface device 130 indicates that an acknowledgement of receipt of the input data is not required, the human interface device 130 may operate in a power saving mode to reduce radio energy to be consumed.

Conventionally, the wireless communication link established between the receiver device 120 and the human interface device 130 for the data communication may often exhibit a high latency. As described above, the system 100 in accordance with various embodiments may utilise the airtime provided to the receiver device 120 to perform radio activities for establishing a better wireless connection. As such, in accordance with various embodiments, the receiver device 120 and/or the human interface device 130 may automatically establish the better wireless connection without the user's intervention, while the user uses the human interface device 130.

Figure 4:
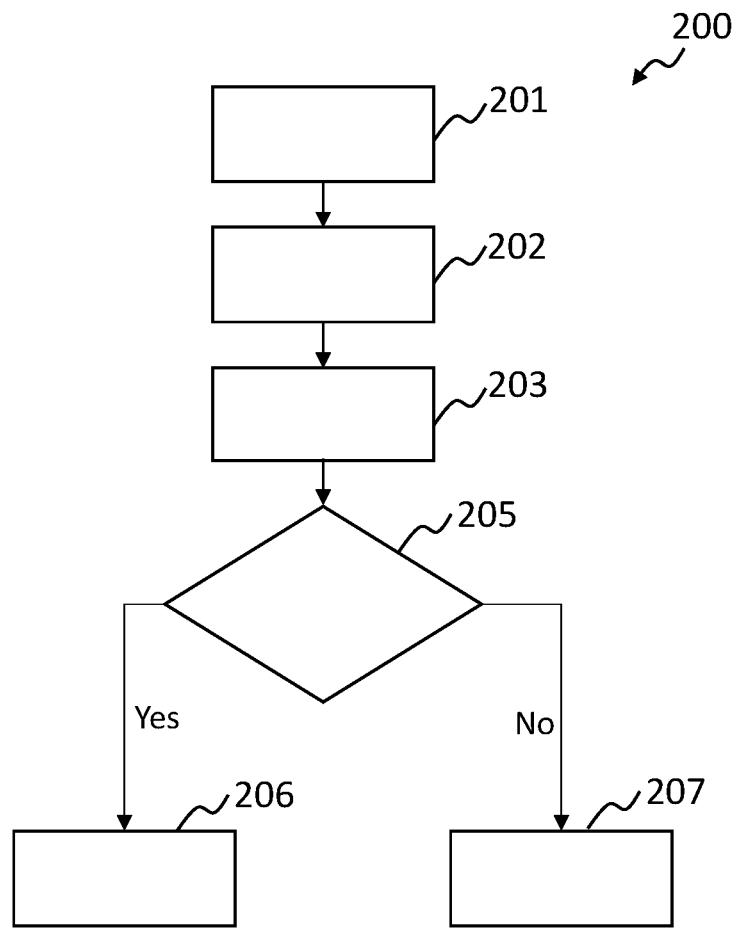
FIG. 4 shows a flowchart of a method according to various embodiments.

FIG. 4 shows a flowchart of a method 200 according to various embodiments. According to various embodiments, the method 200 for facilitating a data communication is provided.

In some embodiments, the method 200 may include a step 201 of generating, by a human interface device, input data for a user input on the human interface device.

In some embodiments, the method 200 may include a step 202 of generating, by the human interface device, control information associated with the input data. In some embodiments, the control information may indicate whether an acknowledgement of receipt of the input data is required.

In some embodiments, the method 200 may include a step 203 of transmitting the input data and the control information from the human interface device to a receiver device. In some embodiments, the receiver device is coupled to a host device and communicatively connected to the human interface device.

In some embodiments, the method 200 may include a step 205 of checking whether an acknowledgement of receipt of the input data is required or not required, from the control information received from the human interface device.

In some embodiments, the method 200 may include a step 206 of transmitting an acknowledgement packet from the receiver device to the human interface device, if the control information received from the human interface device indicates that an acknowledgement of receipt of the input data is required.

In some embodiments, the method 200 may include a step 207 of performing, by the receiver device, a background task (e.g. establishing a new wireless connection for at least one of the receiver device and the human interface device), if the control information received from the human interface device indicates that an acknowledgement of receipt of the input data is not required.

Although not shown in FIG. 4, in some embodiments, the method 200 may further include a step of transmitting the input data from the receiver device to a host device. In some embodiments, the receiver device is (detachably) couplable to the host device.

Figure 5:
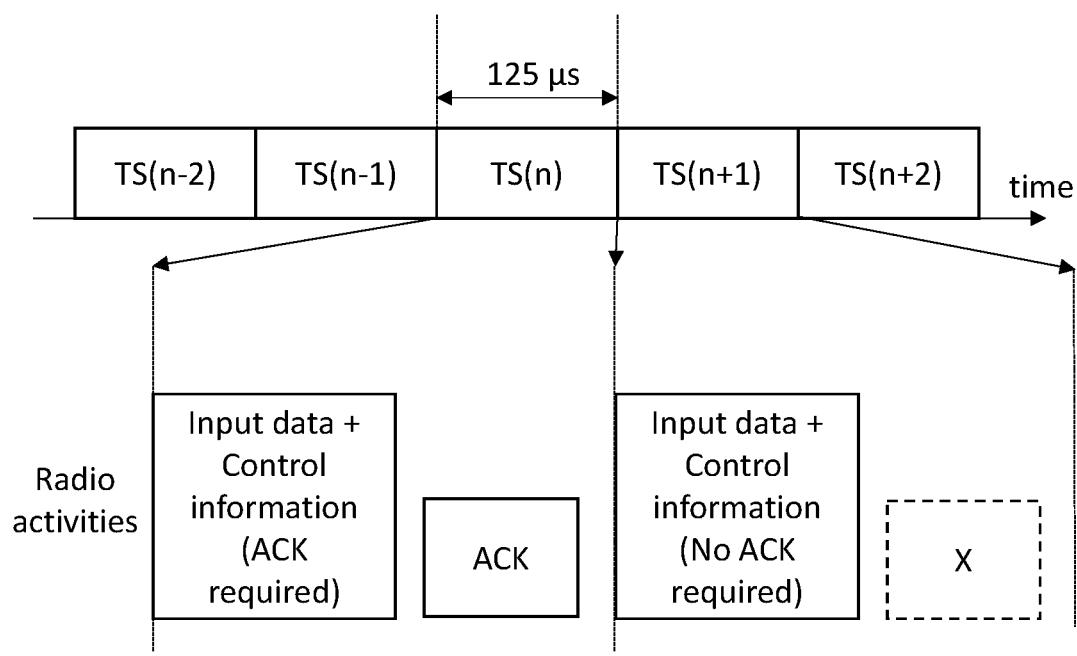
FIG. 5 shows an example time slot configuration showing interactions between a receiver device and a human interface device according to various embodiments.

FIG. 5 shows an example time slot configuration showing interactions between a receiver device 120 and a human interface device 130 according to various embodiments. The term "time slot" may be used interchangeably with the term "time interval".

As shown in FIG. 5, in a time slot (for example, TS(n)), the human interface device 130 may transmit the input data and the control information to the receiver device 120. The control information may indicate that an acknowledgement of receipt of the input data is required. The receiver device 120 may receive the input data and the control information from the human interface device 130, and transmit the acknowledgement packet (indicated as "ACK" in FIG. 5) to the human interface device 130.

As shown in FIG. 5, in a next time slot (for example, TS(n+1)), the human interface device 130 may transmit the input data and the control information to the receiver device 120. The control information may indicate that an acknowledgement of receipt of the input data is not required. The receiver device 120 may receive the input data and the control information from the human interface device 130. The receiver device 120 may operate in a power saving mode to reduce radio energy to be consumed. The receiver device 120 may not transmit the acknowledgement packet to the human interface device 130. In this manner, the transmission of the acknowledge packet may be omitted, for example, periodically, to reduce the radio energy to be consumed.

For example, as shown in FIG. 5, a time interval of each time slot may be 125 μs and a polling rate of the human interface device 130 may be 8000 Hz, but not be limited thereto.

Figure 6:
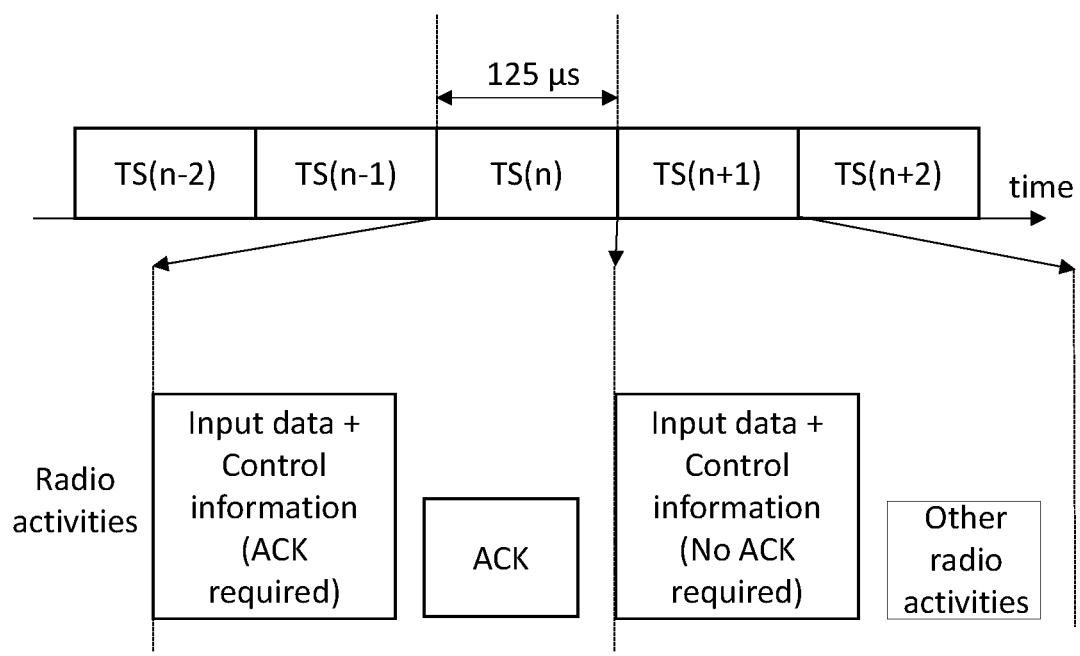
FIG. 6 shows another example time slot configuration showing interactions between a receiver device and a human interface device according to various embodiments.

FIG. 6 shows another example time slot configuration showing interactions between a receiver device 120 and a human interface device 130 according to various embodiments.

As shown in FIG. 6, in a time slot (for example, TS(n)), the human interface device 130 may transmit input data and control information to the receiver device 120. The control information may indicate that an acknowledgement of receipt of the input data is required. The receiver device 120 may receive the input data and the control information from the human interface device 130, and transmit the acknowledgement packet (indicated as "ACK" in FIG. 6) to the human interface device 130.

As shown in FIG. 6, in a next time slot (for example, TS(n+1)), the human interface device 130 may transmit the input data and the control information to the receiver device 120. The control information may indicate that an acknowledgement of receipt of the input data is not required. The receiver device 120 may receive the input data and the control information from the human interface device 130. The receiver device 120 may not transmit the acknowledgement packet to the human interface device 130, and may perform other radio activities, for example, a task for establishing a new wireless connection for at least one of the receiver device 120 and the human interface device 130.

For example, as shown in FIG. 6, a time interval of each time slot may be 125 μs and a polling rate of the human interface device 130 may be 8000 Hz, but not be limited thereto.

Figure 7:
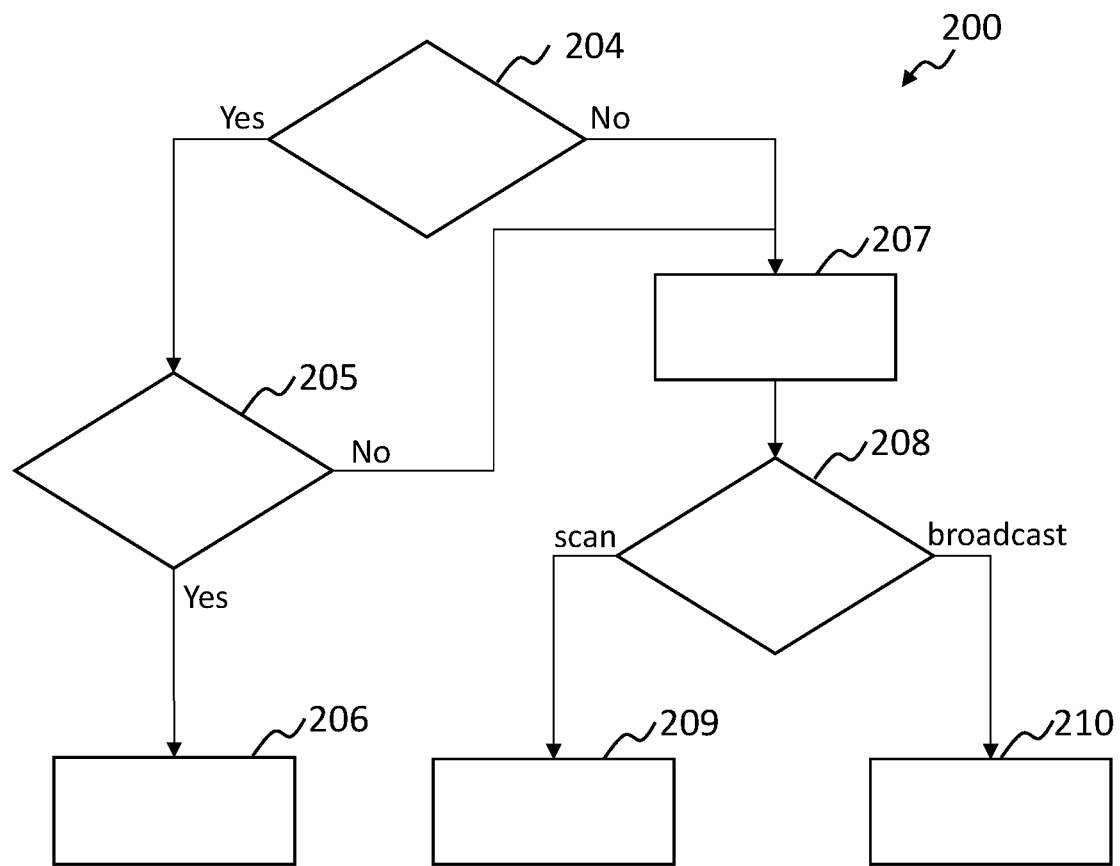
FIG. 7 shows another flowchart of a method according to various embodiments.

FIG. 7 shows another flowchart of a method 200 according to various embodiments. According to various embodiments, the method 200 for facilitating a data communication is provided. In some embodiments, the method 200 of FIG. 7 may be combined with the steps 201, 202 and 203 of the method 200 of FIG. 4.

In some embodiments, after the step 203 of FIG. 4, the method 200 may include a step 204 of checking whether the receiver device receives the input data and the control information from the human interface device.

In some embodiments, the method 200 may include a step 205 of checking whether an acknowledgement of receipt of the input data is required or not required from the control information received from the human interface device, if the receiver device receives the input data and the control information from the human interface device.

In some embodiments, the method 200 may include a step 206 of transmitting an acknowledgement packet from the receiver device to the human interface device, if the control information received from the human interface device indicates that an acknowledgement of receipt of the input data is required.

In some embodiments, the method 200 may include a step 207 of performing, by the receiver device, a background task (e.g. establishing a new wireless connection for at least one of the receiver device and the human interface device), if the receiver device does not receive the input data and control information from the human interface device or if the control information received from the human interface device indicates that an acknowledgement of receipt of the input data is not required.

In some embodiments, the method 200 may include a step 208 of deciding, by the receiver device, whether to scan one or more available channels or broadcast a signal about an identity of the receiver device.

In some embodiments, the method 200 may include a step 209 of scanning, by the receiver device, the one or more available channels, if the receiver device decides to scan the one or more available channels. In some embodiments, the receiver device may scan the one or more available channels in a vicinity of the receiver device. For example, the receiver device may scan for one or more less busy channels.

In some embodiments, the method 200 may include a step 210 of broadcasting, by the receiver device, the signal about the identity of the receiver device, if the receiver device decides to broadcast the signal. In some embodiments, the receiver device may broadcast the identity of the receiver device to a vicinity of the receiver device, to communicate with another receiver device 140 and/or another human interface device 150.

In some embodiments, the method 200 may include an alternative step to step 208 of first deciding, by the receiver device, whether to scan one or more available channels. If the receiver device decides not to scan the one or more available channels, the method 200 may then include an alternative step prior to step 210 of deciding, by the receiver device, whether to broadcast a signal about an identity of the receiver device.

Figure 8:
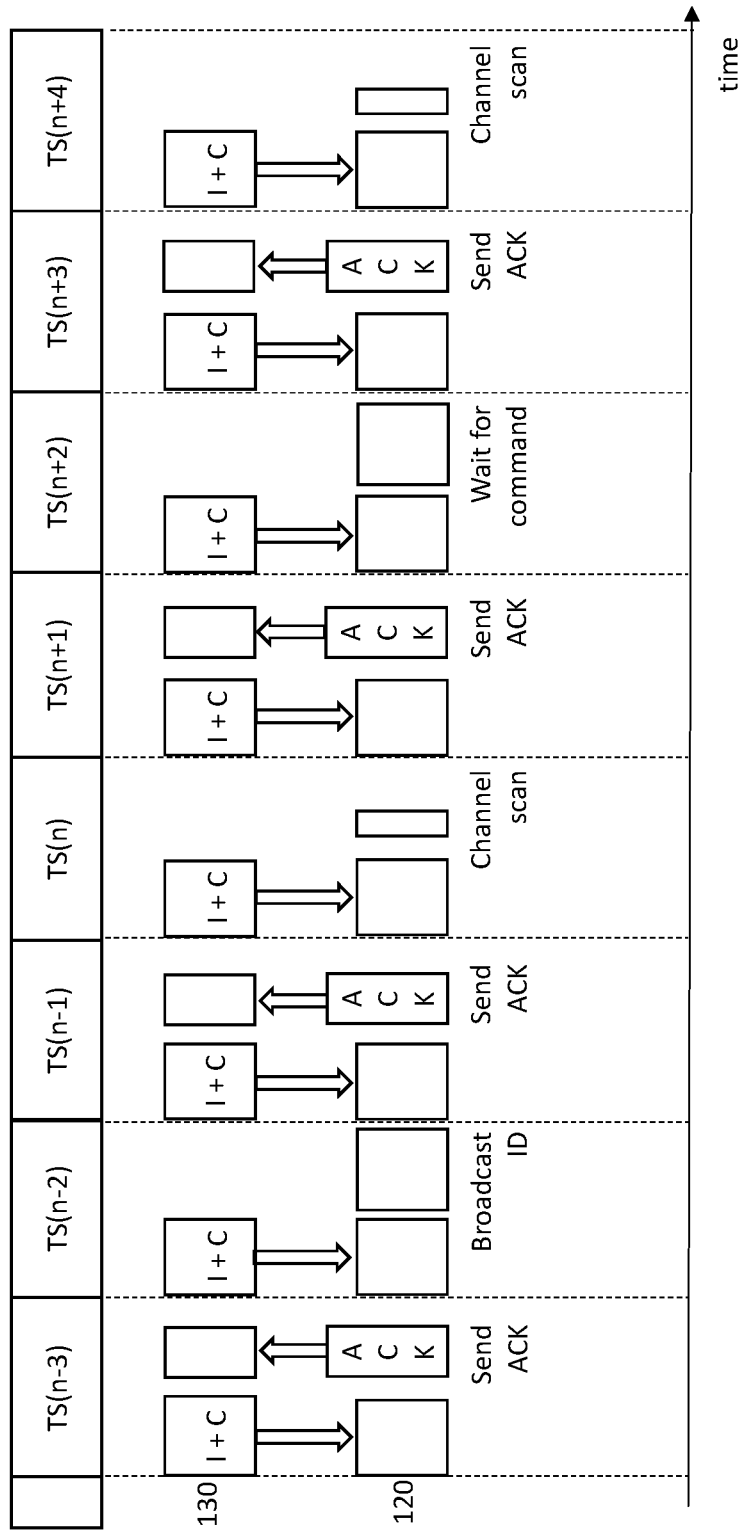
FIG. 8 shows another example time slot configuration showing interactions between a receiver device and a human interface device according to various embodiments.
Figure 9:
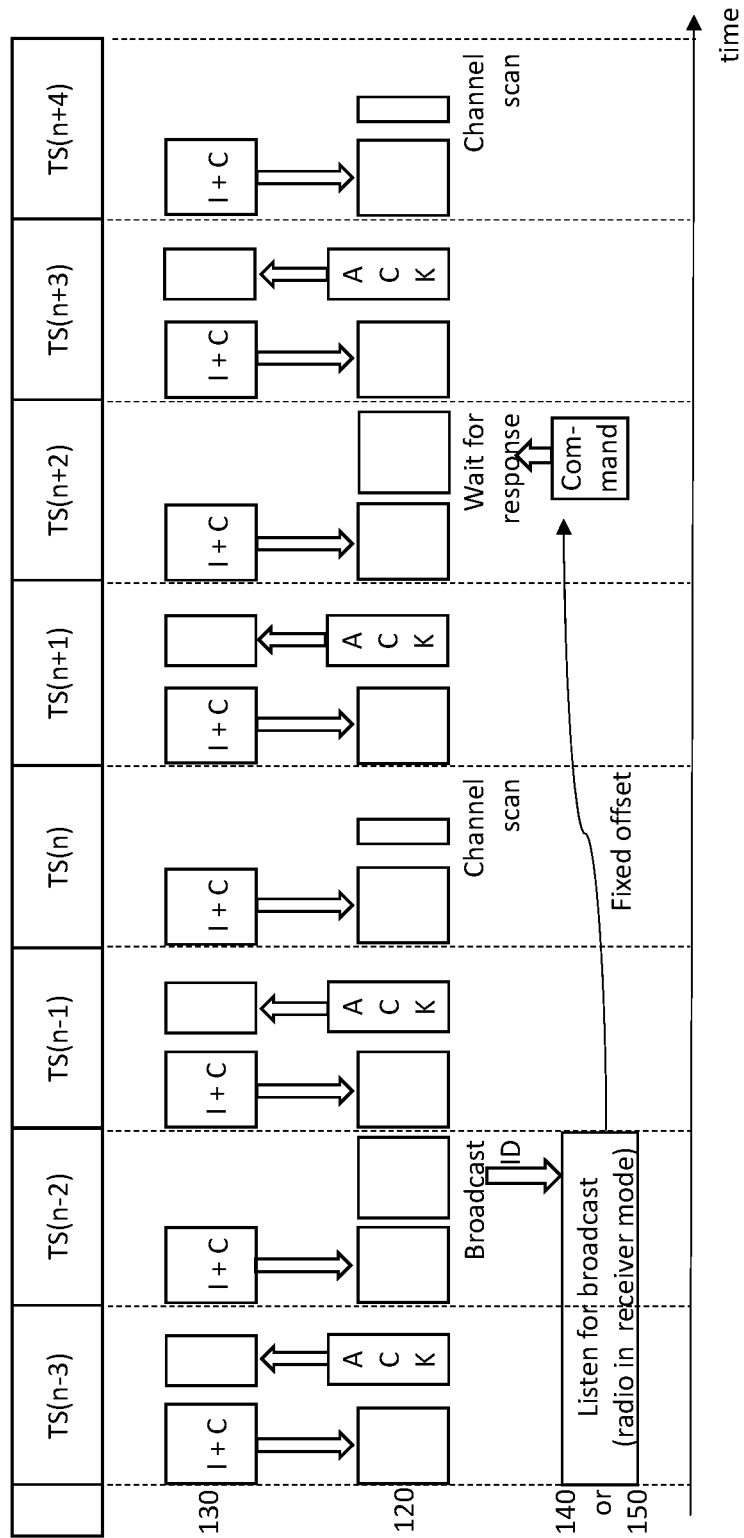
FIG. 9 shows another example time slot configuration showing interactions between a receiver device and a human interface device according to various embodiments.

FIG. 8 shows another example time slot configuration showing interactions between a receiver device 120 and a human interface device 130 according to various embodiments. FIG. 9 shows another example time slot configuration showing interactions between the receiver device 120 and the human interface device 130 according to various embodiments.

As shown in FIG. 8, in some embodiments, the human interface device 130 may request an acknowledgement of receipt of the input data to the receiver device 120 every other time slot.

As shown in FIG. 8, in a time slot (for example, TS(n−3)), the human interface device 130 may transmit the input data (indicated as "I" in FIG. 8) and the control information (indicated as "C" in FIG. 8) to the receiver device 120. The control information may indicate that an acknowledgement of receipt of the input data is required. The receiver device 120 may receive the input data and the control information from the human interface device 130, and transmit the acknowledgement packet (indicated as "ACK" in FIG. 8) to the human interface device 130.

As shown in FIG. 8, in a next time slot (for example, TS(n−2)), the human interface device 130 may transmit the input data and the control information to the receiver device 120. The control information may indicate that an acknowledgement of receipt of the input data is not required. The receiver device 120 may receive the input data and the control information from the human interface device 130. The receiver device 120 may not transmit the acknowledgement packet to the human interface device 130, and may broadcast a signal about an identity of the receiver device 120.

As shown in FIG. 8, in a next time slot (for example, TS(n−1)), the human interface device 130 may transmit the input data and the control information to the receiver device 120. The control information may indicate that an acknowledgement of receipt of the input data is required. The receiver device 120 may receive the input data and the control information from the human interface device 130, and transmit the acknowledgement packet to the human interface device 130.

As shown in FIG. 8, in a next time slot (for example, TS(n)), the human interface device 130 may transmit the input data and the control information to the receiver device 120. The control information may indicate that an acknowledgement of receipt of the input data is not required. The receiver device 120 may receive the input data and the control information from the human interface device 130. The receiver device 120 may not transmit the acknowledgement packet to the human interface device 130, and may scan one or more available channels, for example, less busy channels.

As shown in FIG. 8, in a next time slot (for example, TS(n+1)), the human interface device 130 may transmit the input data and the control information to the receiver device 120. The control information may indicate that an acknowledgement of receipt of the input data is required. The receiver device 120 may receive the input data and the control information from the human interface device 130, and transmit the acknowledgement packet to the human interface device 130.

As shown in FIG. 8, in a next time slot (for example, TS(n+2)), the human interface device 130 may transmit the input data and the control information to the receiver device 120. The control information may indicate that an acknowledgement of receipt of the input data is not required. The receiver device 120 may receive the input data and the control information from the human interface device 130. The receiver device 120 may not transmit the acknowledgement packet to the human interface device 130, and may wait for a command from another receiver device 140 or another human interface device 150 (as will be described below with FIG. 9).

As shown in FIG. 8, in a next time slot (for example, TS(n+3)), the human interface device 130 may transmit the input data and the control information to the receiver device 120. The control information may indicate that an acknowledgement of receipt of the input data is required. The receiver device 120 may receive the input data and the control information from the human interface device 130, and transmit the acknowledgement packet to the human interface device 130.

As shown in FIG. 8, in a next time slot (for example, TS(n+4)), the human interface device 130 may transmit the input data and the control information to the receiver device 120. The control information may indicate that an acknowledgement of receipt of the input data is not required. The receiver device 120 may receive the input data and the control information from the human interface device 130. The receiver device 120 may not transmit the acknowledgement packet to the human interface device 130, and may scan one or more available channels, for example, less busy channels.

As shown in FIG. 9, in the time slots (for example, TS(n−3) and TS(n−2)), the another receiver device 140 or the another human interface device 150 may listen for broadcasting. In the time slot (for example, TS(n−2)), the another receiver device 140 or the another human interface device 150 may detect the receiver device 120 by the broadcasted signal. Thereafter, in the later time slot (for example, TS(n+2)), the another receiver device 140 or the another human interface device 150 may transmit the command to the receiver device 120. For example, the another receiver device 140 may transmit a command for disconnecting the receiver device 120 from the human interface device 130 to the receiver device 120. As another example, the another human interface device 150 may transmit a command for a request for a connection to the receiver device 120.

As shown in FIG. 9, a broadcast message communication may be carried out once every certain number of time slots, according to a fixed offset. The fixed offset may refer to a transmission interval of the broadcast message communication. In some embodiments, as shown in FIG. 9, a first time slot (for example, TS(n−3)) may be used for an acknowledgement, a second time slot (for example, TS(n−2)) may be used to send a broadcast message, a third time slot (for example, TS(n−1)) may be used for an acknowledgement, a fourth time slot (for example, TS(n)) may be used to scan the RSSI for one or more available channels, a fifth time slot (for example, TS(n+1)) may be used for an acknowledgement, a sixth time slot (for example, TS(n+2)) may be used to receive a broadcast message, a seventh time slot (for example, TS(n+3)) may be used for an acknowledgement, and an eighth time slot (for example, TS(n+4)) may be used to scan the RSSI for one or more available channels. In FIG. 9, the fixed offset value may be four (4) (i.e. a difference between the second time slot (for example, TS(n−2)) and the sixth time slot (for example, TS(n+2))), which means that the broadcast message communication is carried out once every four (4) time slots.

Figure 10:
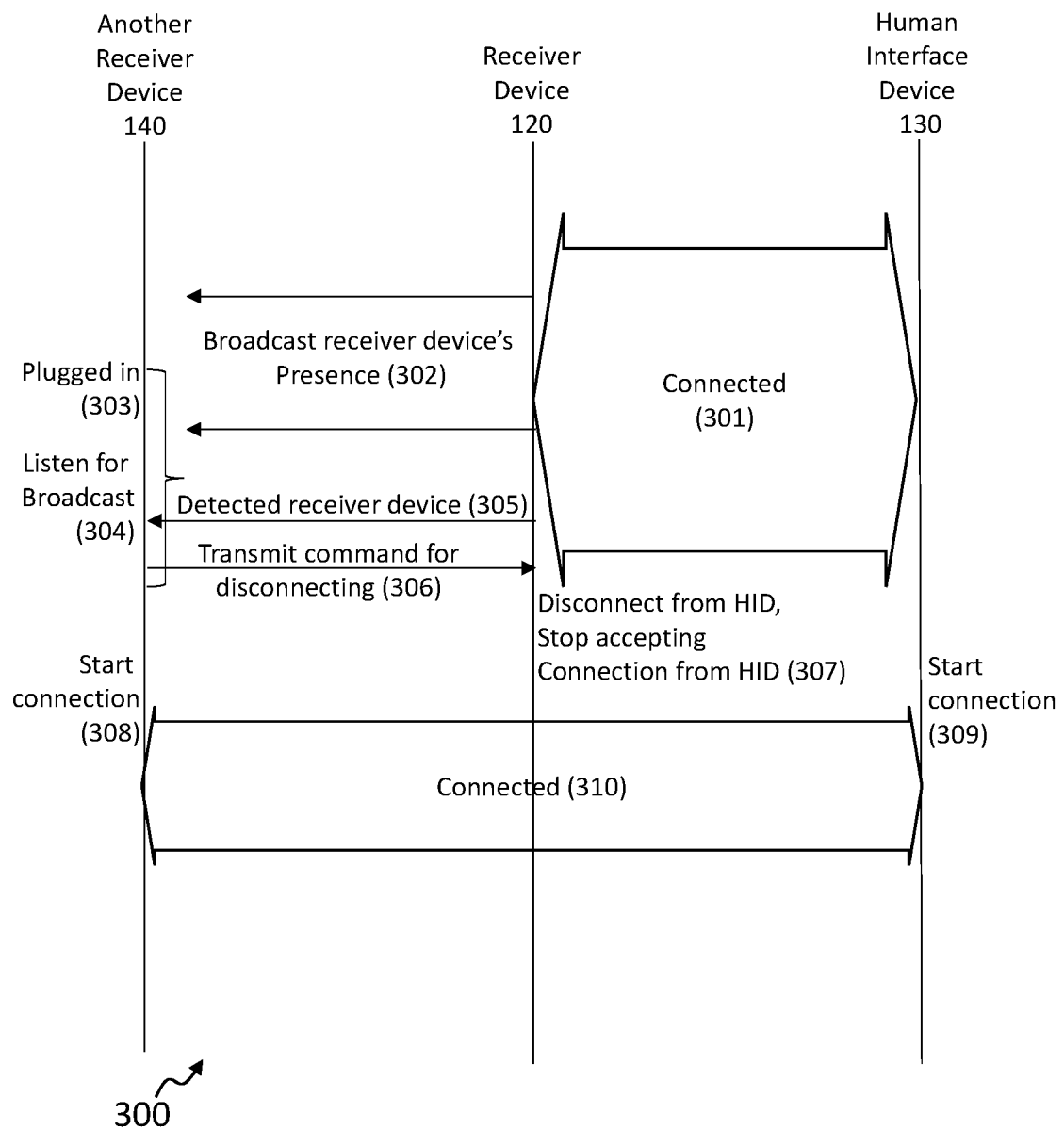
FIG. 10 shows a sequence diagram showing a method including interactions between a receiver device and a human interface device according to various embodiments.

FIG. 10 shows a sequence diagram showing a method 300 including interactions between a receiver device 120 and a human interface device 130 according to various embodiments. According to various embodiments, the method 300 for facilitating a data communication is provided.

As shown in FIG. 10, in some embodiments, the method 300 may include a step 301 of which the receiver device 120 and the human interface device 130 are connected.

In some embodiments, the method 300 may include a step 302 of which the receiver device 120 broadcasts the receiver device's 120 presence.

In some embodiments, the method 300 may include a step 303 of which the another receiver device 140 is plugged in. For example, a user may plug the another receiver device 140 in the host device 110 or other computing device.

In some embodiments, the method 300 may include a step 304 of which the another receiver device 140 listens for broadcasting.

In some embodiments, the method 300 may include a step 305 of which the another receiver device 140 detects the receiver device 120 by the broadcasted signal.

In some embodiments, the method 300 may include a step 306 of which the another receiver device 140 transmits a command for disconnecting the receiver device 120 from the human interface device 130 to the receiver device 120.

In some embodiments, the method 300 may include a step 307 of which the receiver device 120 disconnects from the human interface device 130. In some embodiments, the receiver device 120 may stop accepting a request for a connection from the human interface device 130.

In some embodiments, the method 300 may include a step 308 of which the another receiver device 140 starts a connection with the human interface device 130.

In some embodiments, the method 300 may include a step 309 of which the human interface device 130 starts a connection with the another receiver device 140.

In some embodiments, the steps 308 and 309 may be commenced at the same time. In some other embodiments, the step 308 may be commenced earlier than the step 309. In some other embodiments, the step 309 may be commenced earlier than the step 308.

In some embodiments, the method 300 may include a step 310 of which the another receiver device 140 and the human interface device 130 may be connected.

Figure 11:
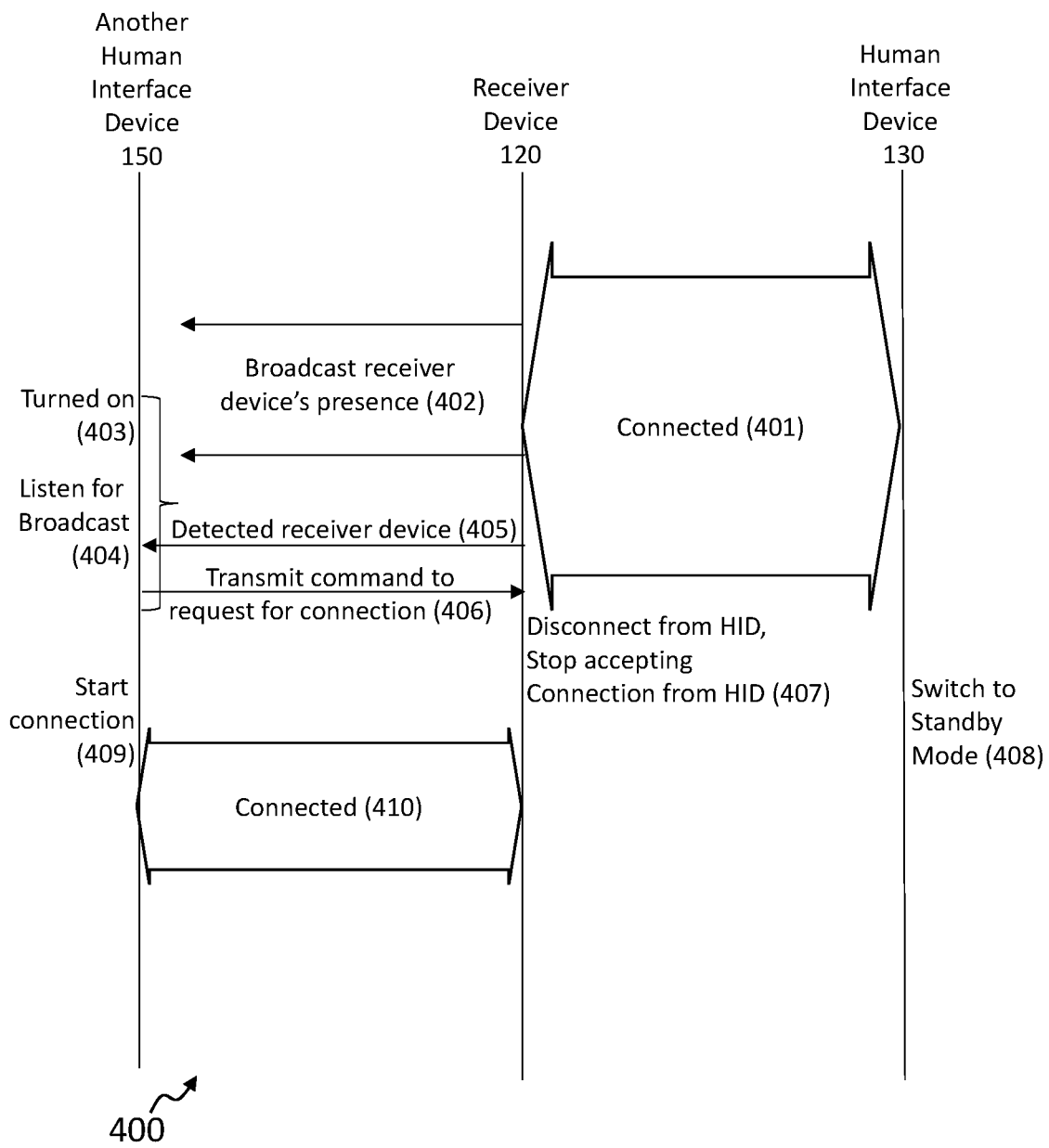
FIG. 11 shows another sequence diagram showing a method including interactions between a receiver device and a human interface device according to various embodiments.

FIG. 11 shows another sequence diagram showing a method 400 including interactions between a receiver device 120 and a human interface device 130 according to various embodiments. According to various embodiments, the method 400 for facilitating a data communication is provided.

As shown in FIG. 11, in some embodiments, the method 400 may include a step 401 of which the receiver device 120 and the human interface device 130 are connected.

In some embodiments, the method 400 may include a step 402 of which the receiver device 120 broadcasts the receiver device's 120 presence.

In some embodiments, the method 400 may include a step 403 of which the another human interface device 150 is turned on. For example, a user may turn on the another human interface device 150.

In some embodiments, the method 400 may include a step 404 of which the another human interface device 150 listens for broadcasting.

In some embodiments, the method 400 may include a step 405 of which the another human interface device 150 detects the receiver device 120 by the broadcasted signal.

In some embodiments, the method 400 may include a step 406 of which the another human interface device 150 transmits a command for a request for a connection to the receiver device 120.

In some embodiments, the method 400 may include a step 407 of which the receiver device 120 disconnects from the human interface device 130. In some embodiments, the receiver device 120 may stop accepting a request for a connection from the human interface device 130.

In some embodiments, the method 400 may include a step 408 of which the human interface device 130 switches to a standby mode.

In some embodiments, the method 400 may include a step 409 of which the another human interface device 150 starts a connection with the receiver device 120.

In some embodiments, the method 400 may include a step 410 of which the another human interface device 150 and the receiver device 120 may be connected.

Figure 12:
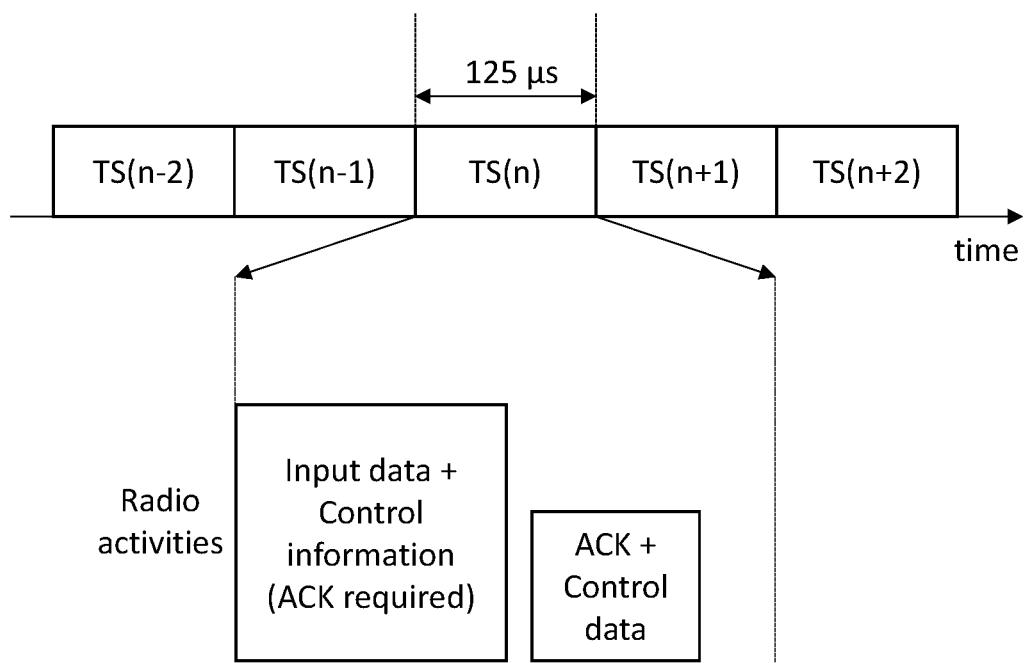
FIG. 12 shows another example slot configuration showing interactions between a receiver device and a human interface device according to various embodiments.

FIG. 12 shows another example time slot configuration showing interactions between a receiver device 120 and a human interface device 130 according to various embodiments.

As shown in FIG. 12, in a time slot (for example, TS(n)), the human interface device 130 may transmit the input data and the control information to the receiver device 120. The control information may indicate that an acknowledgement of receipt of the input data is required. The receiver device 120 may receive the input data and the control information from the human interface device 130. The receiver device 120 may then transmit the acknowledgement packet (indicated as "ACK" in FIG. 12) and control data for controlling the human interface device 130 to the human interface device 130.

For example, as shown in FIG. 12, a time interval of each time slot may be 125 μs and a polling rate of the human interface device 130 may be 8000 Hz, but not be limited thereto.

Figure 13:
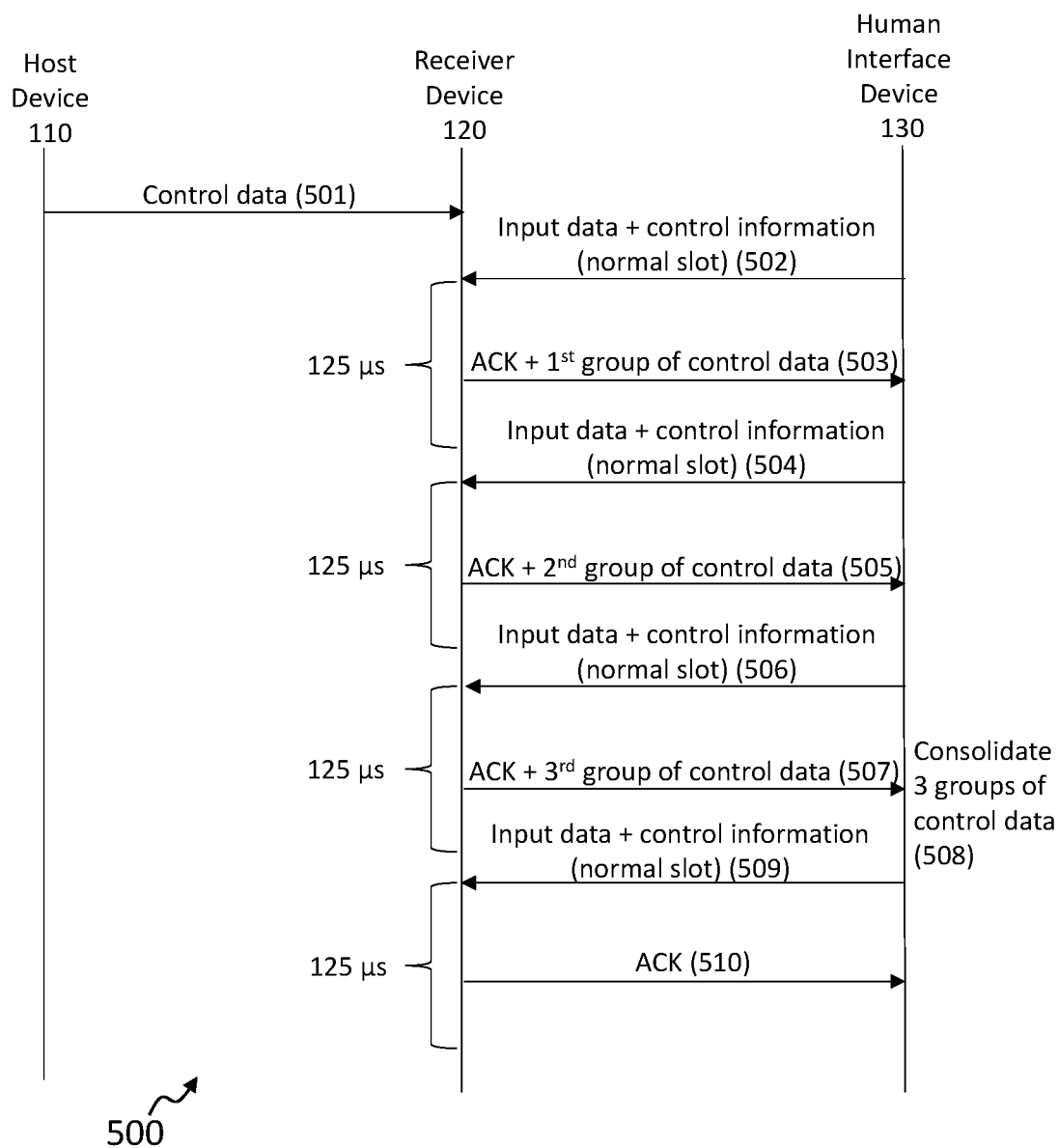
FIG. 13 shows another sequence diagram showing a method including interactions between a receiver device and a human interface device according to various embodiments.

FIG. 13 shows another sequence diagram showing a method 500 including interactions between a receiver device 120 and a human interface device 130 according to various embodiments. According to various embodiments, the method 500 for facilitating a data communication is provided.

As shown in FIG. 13, in some embodiments, the method 500 may include a step 501 of which the host device 110 transmits control data for controlling the human interface device 130 to the receiver device 120.

In some embodiments, although not shown, the receiver device 120 may split the control data into a plurality of groups of the control data, for example three (3) groups of the control data (hereinafter, referred to as a "first group of the control data", a "second group of the control data" and a "third group of the control data"). In some embodiments, the receiver device 120 may split the control data into the plurality of groups of the control data, if a size of the control data exceeds a predetermined size.

In some embodiments, the method 500 may include a step 502 of which the human interface device 130 transmits input data and control information to the receiver device 120. In some embodiments, the control information may indicate whether an acknowledgement of receipt of the input data is required. For example, the control information may indicate that an acknowledgement of receipt of the input data is required.

In some embodiments, the method 500 may include a step 503 of which the receiver device 120 transmits an acknowledgement packet and the first group of the control data to the human interface device 130.

In some embodiments, the method 500 may include a step 504 of which the human interface device 130 transmits input data and control information to the receiver device 120. In some embodiments, the control information may indicate whether an acknowledgement of receipt of the input data is required. For example, the control information may indicate that an acknowledgement of receipt of the input data is required.

In some embodiments, the method 500 may include a step 505 of which the receiver device 120 transmits an acknowledgement packet and the second group of the control data to the human interface device 130.

In some embodiments, the method 500 may include a step 506 of which the human interface device 130 transmits input data and control information to the receiver device 120. In some embodiments, the control information may indicate whether an acknowledgement of receipt of the input data is required. For example, the control information may indicate that an acknowledgement of receipt of the input data is required.

In some embodiments, the method 500 may include a step 507 of which the receiver device 120 transmits an acknowledgement packet and the third group of the control data to the human interface device 130.

In some embodiments, the method 500 may include a step 508 of which the human interface device 130 consolidates the first group, the second group and the third group of the control data. Although not shown, the human interface device 130 may control one or more components of the human interface device 130, for example, each light source of the plurality of light sources, based on the consolidated control data.

In some embodiments, the method 500 may include a step 509 of which the human interface device 130 transmits input data and control information to the receiver device 120. In some embodiments, the control information may indicate whether an acknowledgement of receipt of the input data is required. For example, the control information may indicate that an acknowledgement of receipt of the input data is required.

In some embodiments, the method 500 may include a step 510 of which the receiver device 120 transmits an acknowledgement packet to the human interface device 130.

In some embodiments, transmitting the control data with the acknowledgement packet from the receiver device 120 to the human interface device 130 may be performed at a predetermined time interval. For example, as shown in FIG. 13, the predetermined time interval may be 125 µs, but not be limited thereto.

Figure 14:
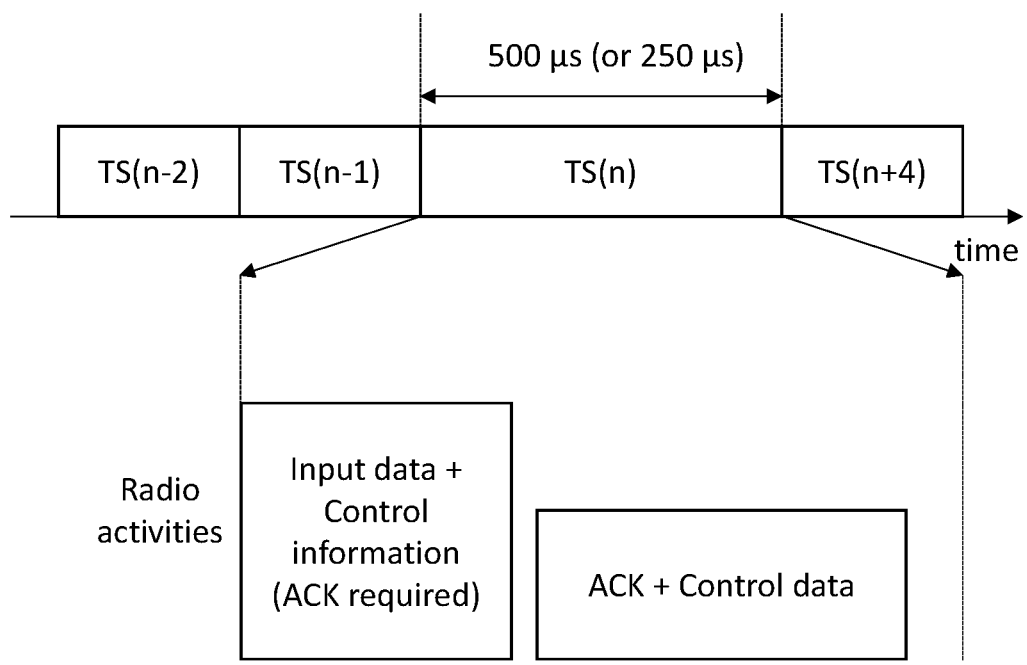
FIG. 14 shows another example time slot configuration showing interactions between a receiver device and a human interface device according to various embodiments.

FIG. 14 shows another example slot configuration showing interactions between a receiver device 120 and a human interface device 130 according to various embodiments.

As shown in FIG. 14, in a time slot (for example, TS(n)), the human interface device 130 may transmit the input data and the control information to the receiver device 120. The control information may indicate that an acknowledgement of receipt of the input data is required. The receiver device 120 may receive the input data and the control information from the human interface device 130.

In some embodiments, if a size of control data received from the host device 110 exceeds a predetermined size, the receiver device 120 may inform the human interface device 130 of pending control data. The human interface device 130 may extend the predetermined time interval, so as to enable the receiver device 120 to transmit the control data exceeding the predetermined size to the human interface device 130 during the extended time interval. For example, as shown in FIG. 14, the human interface device 130 may extend the predetermined time interval to 500 µs or 250 µs. The receiver device 120 may then transmit the acknowledgement packet (indicated as "ACK" in FIG. 14) and the control data for controlling the human interface device 130 to the human interface device 130 during the extended time interval.

Figure 15:
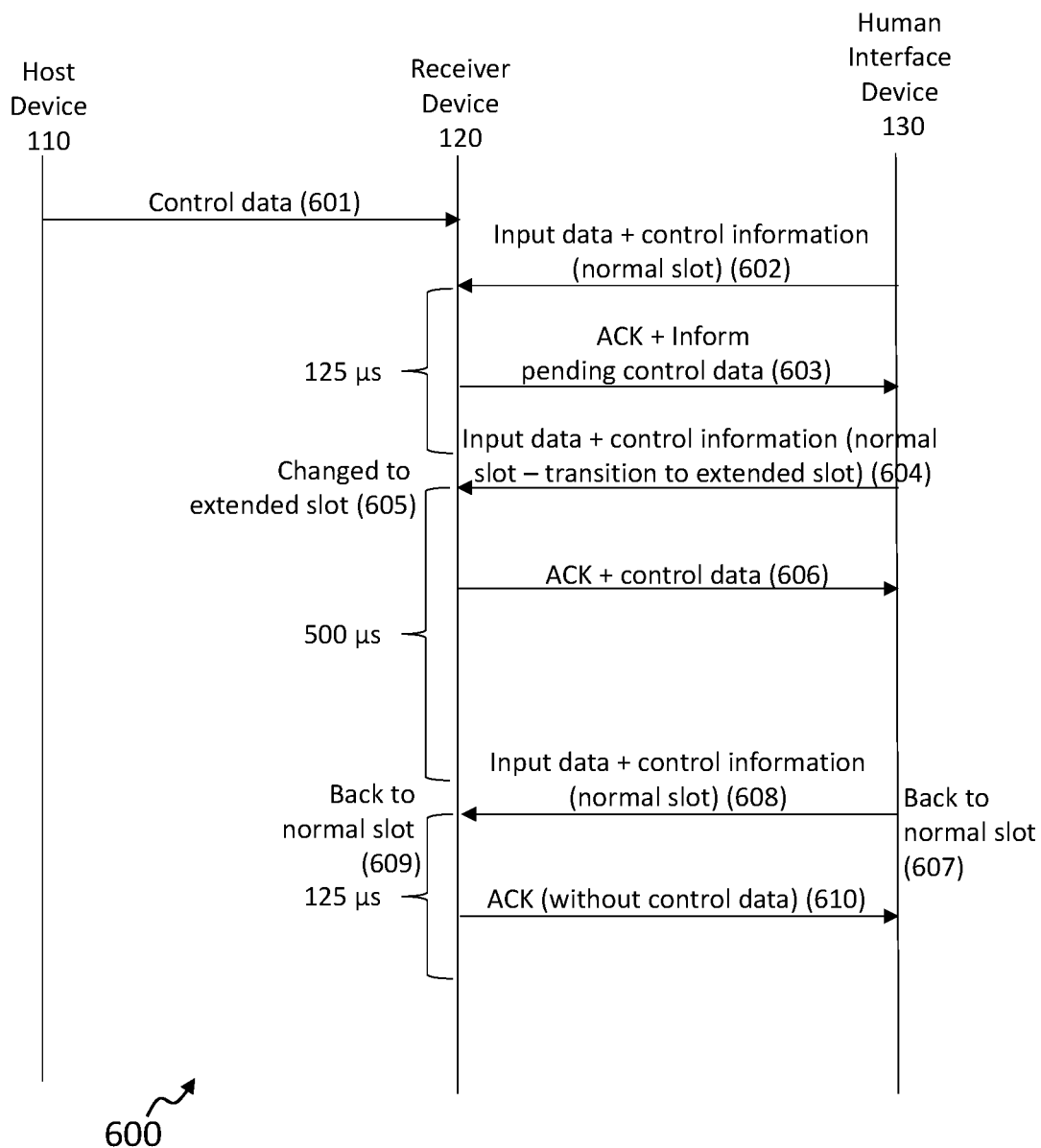
FIG. 15 shows another sequence diagram showing a method including interactions between a receiver device and a human interface device according to various embodiments.

FIG. 15 shows another sequence diagram showing a method 600 including interactions between a receiver device 120 and a human interface device 130 according to various embodiments. According to various embodiments, the method 600 for facilitating a data communication is provided.

As shown in FIG. 15, in some embodiments, the method 600 may include a step 601 of which the host device 110 transmits control data for controlling the human interface device 130 to the receiver device 120.

In some embodiments, the method 600 may include a step 602 of which the human interface device 130 transmits input data and control information to the receiver device 120. In some embodiments, the control information may indicate whether an acknowledgement of receipt of the input data is required. For example, the control information may indicate that an acknowledgement of receipt of the input data is required.

In some embodiments, if a size of the control data exceeds a predetermined size, the receiver device 120 may not be able to transmit the control data to the human interface device 130 during a predetermined time interval. As an example, the predetermined time interval may be 125 µs. In this regard, the receiver device 120 may inform the human interface device 130 of pending control data.

In some embodiments, the method 600 may include a step 603 of which the receiver device 120 transmits an acknowledgement packet to the human interface device 130 and informs the human interface device 130 of the pending control data.

In some embodiments, the method 600 may include a step 604 of which the human interface device 130 transmits input data and control information to the receiver device 120. In some embodiments, the control information may indicate whether an acknowledgement of receipt of the input data is required. For example, the control information may indicate that an acknowledgement of receipt of the input data is required. In the step 604, the human interface device 130 extends the predetermined time interval.

In some embodiments, the method 600 may include a step 605 of which the receiver device 120 changes to the extended time interval.

In some embodiments, the method 600 may include a step 606 of which the receiver device 120 transmits an acknowledgement packet and the control data to the human interface device 130 during the extended time interval. As an example, the extended time interval may be 500 µs.

In some embodiments, the method 600 may include a step 607 of which the human interface device 130 returns the extended time interval, for example, 500 µs or 250 µs, to the predetermined time interval, for example, 125 µs.

In some embodiments, the method 600 may include a step 608 of which the human interface device 130 transmits input data and control information to the receiver device 120. In some embodiments, the control information may indicate whether an acknowledgement of receipt of the input data is required. For example, the control information may indicate that an acknowledgement of receipt of the input data is required.

In some embodiments, the method 600 may include a step 609 of which the receiver device 120 returns the extended time interval, for example, 500 μs or 250 μs, to the predetermined time interval, for example, 125 μs.

In some embodiments, the method 600 may include a step 610 of which the receiver device 120 transmits an acknowledgement packet (for example, without control data) to the human interface device 130 during the predetermined time interval, for example, 125 μs.

In some embodiments, first to N-th predetermined time intervals may be combined as a combined predetermined time interval. At the first to (N−1)-th predetermined time intervals, first to (N−1)-th control information associated with first to (N−1)-th input data may indicate that an acknowledgement of receipt of the first to (N−1)-th input data is not required from the receiver, and at the N-th predetermined time interval, the receiver device may be configured to transmit an acknowledgement packet to the human interface device when N-th control information associated with N-th input data indicates that an acknowledgement of receipt of the N-th input data is required, and perform a background task when the N-th control information received from the human interface device indicates that an acknowledgement of receipt of the N-th input data is not required. N may be equal to 2 or 4 or any even integer.

In some embodiments, for each k, 1≤k≤N, the human interface device may be configured to transmit the first to k-th input data and the first to k-th control information associated with the first to k-th input data to the receiver device at the k-th predetermined time interval, and the receiver device may be configured to transmit the k-th input data to the host device at the k-th predetermined time interval, or wherein the receiver device is configured to transmit the first to k-th input data at the N-th predetermined time interval.

Figure 16:
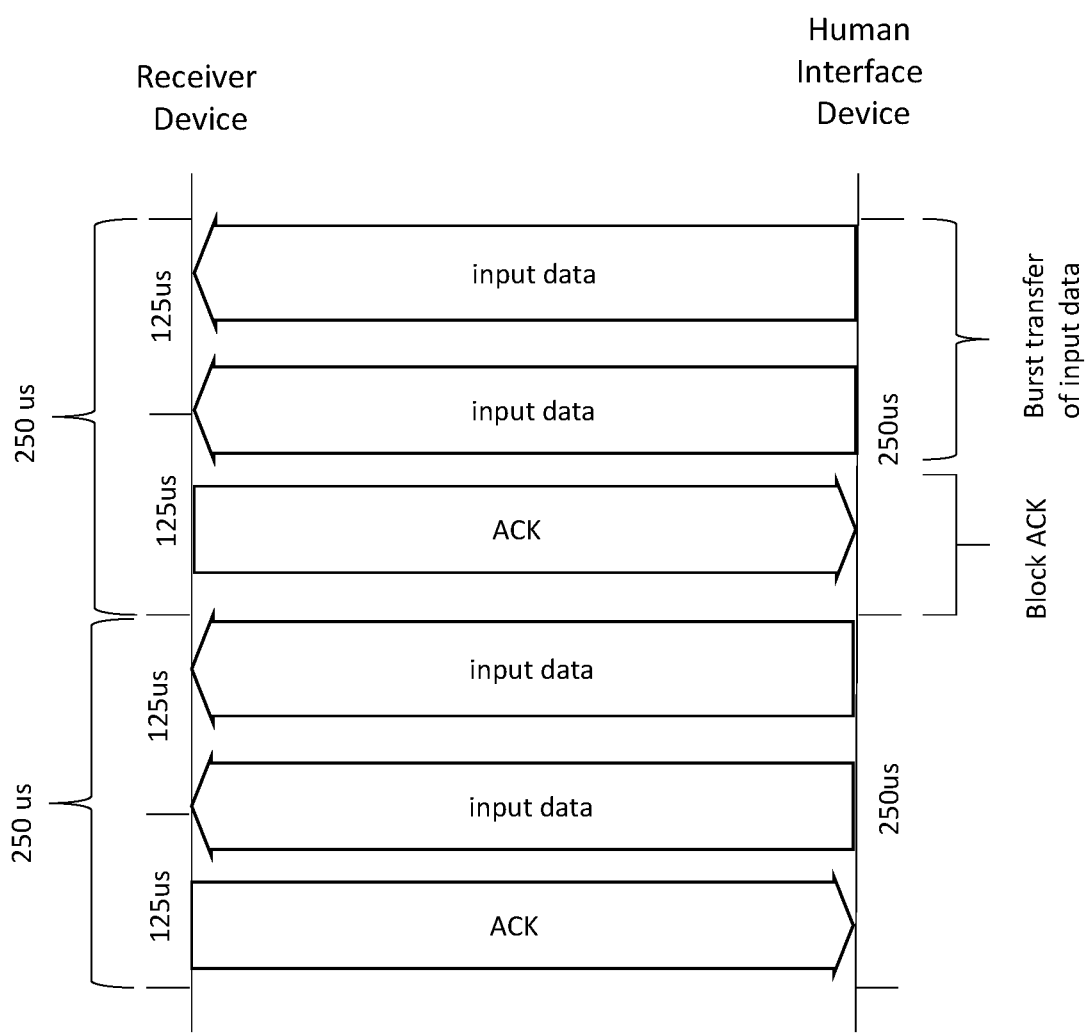
FIG. 16 shows another sequence diagram showing interactions between a receiver device and a human interface device according to various embodiments.
Figure 17:
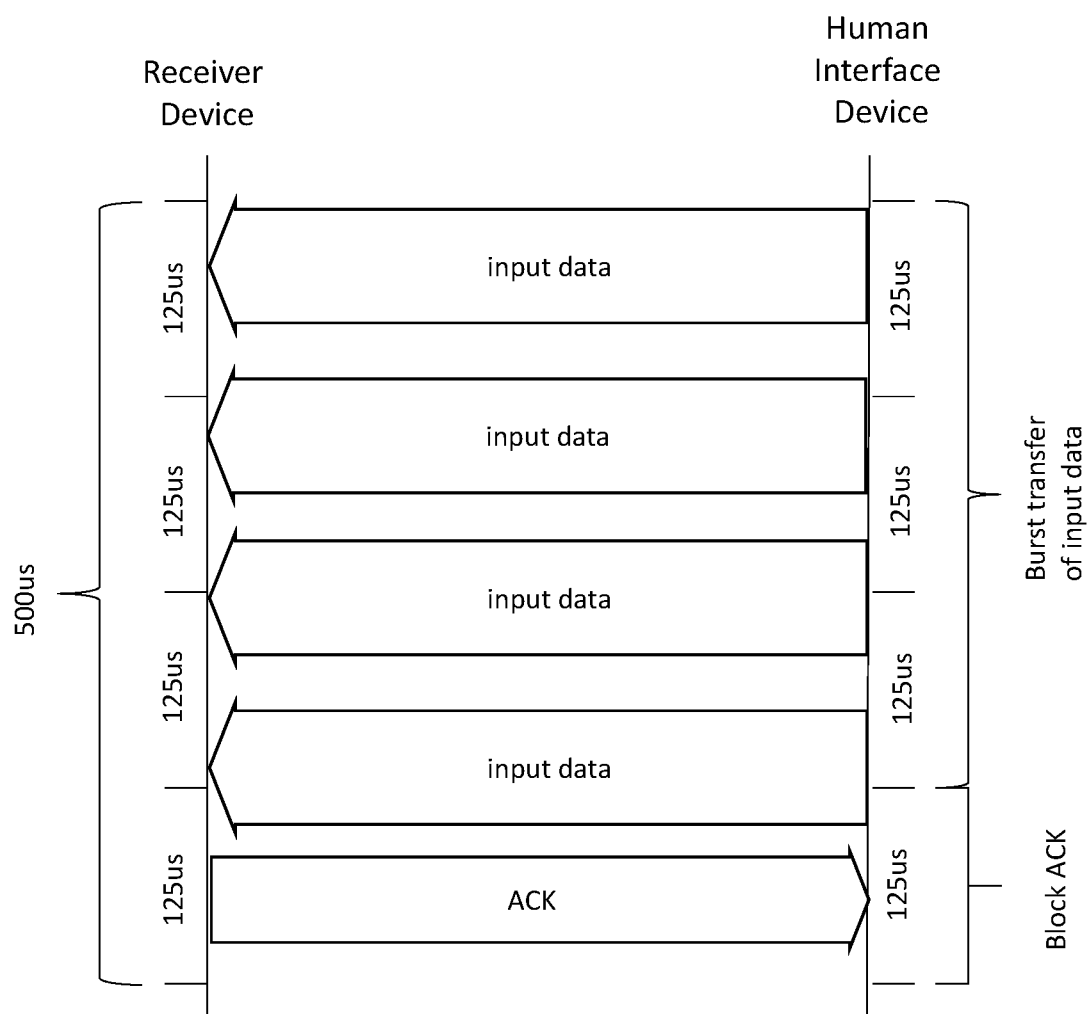
FIG. 17 shows another sequence diagram showing interactions between a receiver device and a human interface device according to various embodiments.
Figure 18:
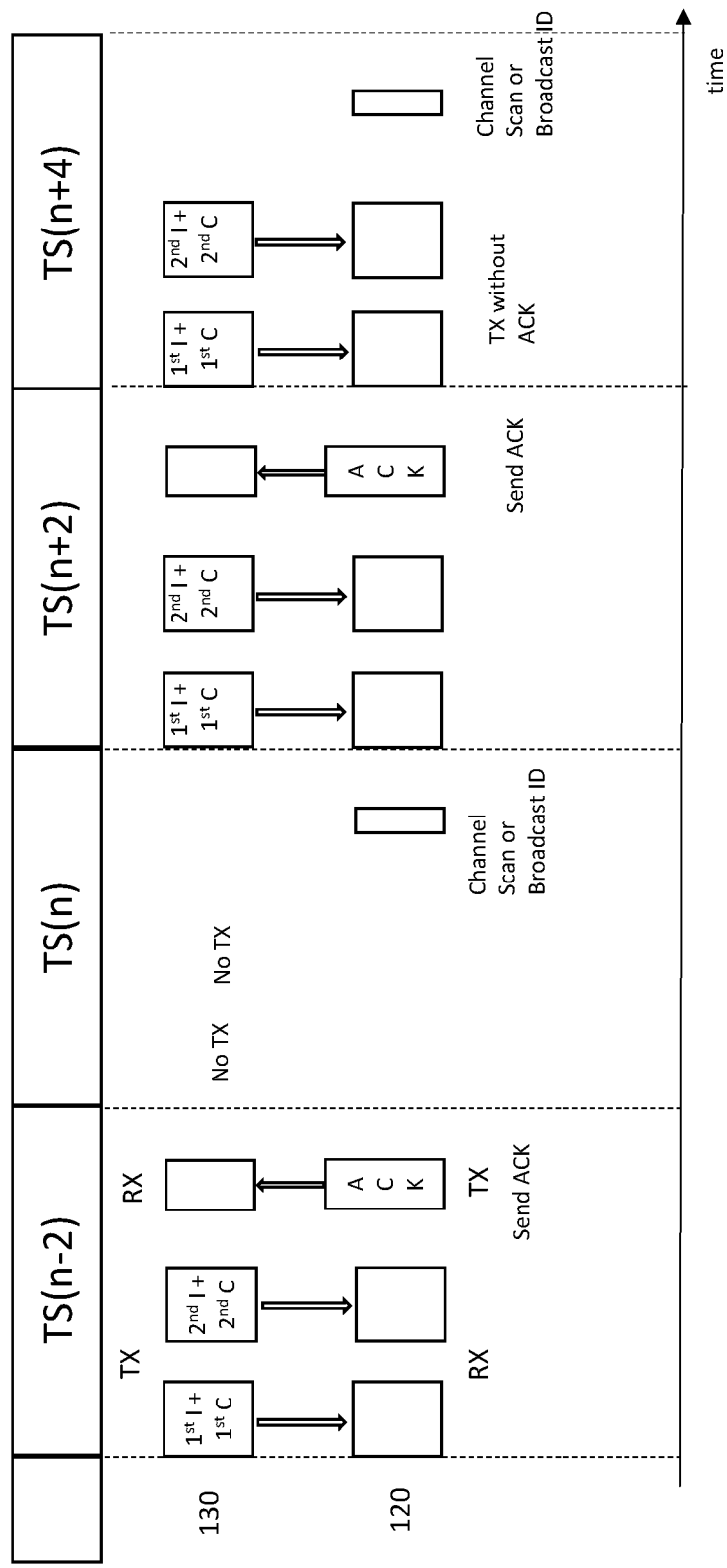
FIG. 18 shows another example time slot configuration showing interactions between a receiver device and a human interface device according to various embodiments.
Figure 19:
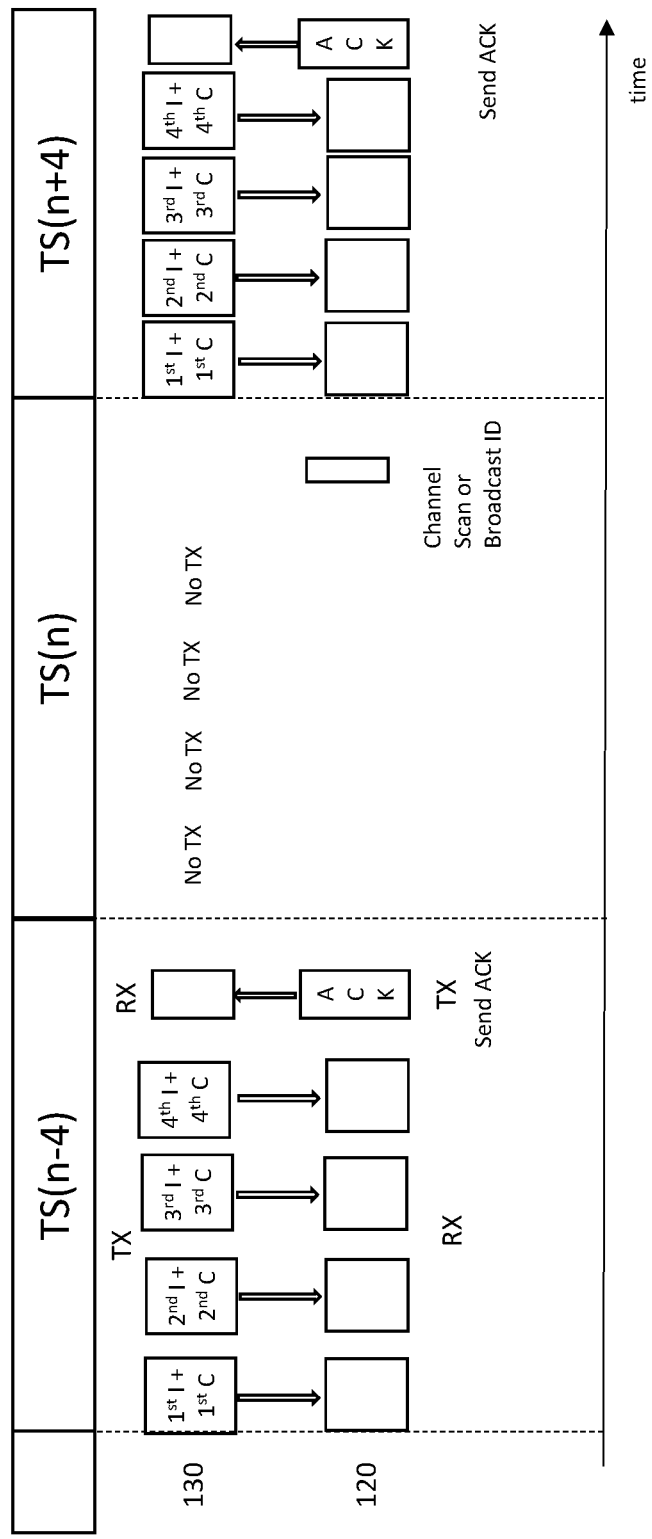
FIG. 19 shows another example time slot configuration showing interactions between a receiver device and a human interface device according to various embodiments.

FIGS. 16 and 17 show another sequence diagrams showing interactions between a receiver device 120 and a human interface device 130 according to various embodiments. FIGS. 18 and 19 show another example time slot configurations showing interactions between a receiver device 120 and a human interface device 130 according to various embodiments.

As shown in FIG. 16, in some embodiments, the predetermined time interval may be 125 μs and N may be equal to 2. In the combined predetermined time interval of 250 μs, the human interface device may transmit the first input data and the first control information to the receiver device in the first predetermined time interval wherein the first control information indicates that an acknowledgement of receipt of the first input data is not required, and the human interface device may further transmit the second input data and the second control information to the receiver device in the second predetermined time interval wherein the second control information may indicate that an acknowledgement of receipt of the first input data is required. The transmission of the first and second input data and control information may be referred as burst transfer of input data. The receiver may transmit an acknowledge packet to the human interface device at the second predetermined time interval, which may be referred as block acknowledgement.

As shown in FIG. 17, the predetermined time interval may be 125 μs and N may be equal to 4. In the combined predetermined time interval of 500 μs, the human interface device may transmit the first to fourth input data and the first to fourth control information to the receiver device in the first to fourth predetermined time intervals, respectively, wherein the first to third control information may indicate that an acknowledgement of receipt of the first input data is not required, and the fourth control information may indicate that an acknowledgement of receipt of the first input data is required. The transmission of the first to fourth input data and control information may be referred as burst transfer of input data. The receiver may transmit an acknowledge packet to the human interface device at the fourth predetermined time interval, which may be referred as block acknowledgement.

The combined predetermined time interval may be divided into two intervals, transmission (as indicated as "TX") interval and reception (as indicated as "RX") interval.

As shown in FIGS. 18 and 19, in some embodiments, the human interface device 130 may request an acknowledgement of receipt of the input data to the receiver device 120 every other combined predetermined time interval.

As shown in FIG. 18, in some embodiments, N may be equal to 2. In a combined time slot (for example, TS(n−2) combined with TS(n−1)), the human interface device 130 may transmit (e.g. in the time slot TS(n−2)) a first input data (indicated as "$1^{st}$ I" in FIG. 18) and a first control information (indicated as "$1^{st}$ C" in FIG. 18) to the receiver device 120 and the human interface device 130 may then transmit (e.g. in the time slot TS(n−1)) a second input data (indicated as "$2^{nd}$ I" in FIG. 18) and a second control information (indicated as "$2^{nd}$ C" in FIG. 18) to the receiver device 120. The second control information may indicate that an acknowledgement of receipt of the input data is required. The receiver device 120 may receive the first and second input data and the first and second control information from the human interface device 130, and transmit (e.g. in the time slot TS(n−1)) the acknowledgement packet (indicated as "ACK" in FIG. 18) to the human interface device 130.

As shown in FIG. 18, in a next combined time slot (for example, TS(n) combined with TS(n−1)), the human interface device 130 may not transmit any input data nor control information to the receiver device 120. The receiver device 120 may scan one or more available channels, for example, less busy channels, or broadcast a signal about an identity of the receiver device 120.

As shown in FIG. 18, in a combined time slot (for example, TS(n+2) combined with TS(n+3)), the human interface device 130 may transmit (e.g. in the time slot TS(n+2)) a first input data (indicated as "$1^{st}$ I" in FIG. 18) and a first control information (indicated as "$1^{st}$ C" in FIG. 18) to the receiver device 120 and the human interface device 130 may then transmit (e.g. in the time slot TS(n+3)) a second input data (indicated as "$2^{nd}$ I" in FIG. 18) and a second control information (indicated as "2n d C" in FIG. 18) to the receiver device 120. The second control information may indicate that an acknowledgement of receipt of the input data is required. The receiver device 120 may receive the first and second input data and the first and second control information from the human interface device 130, and transmit (e.g. in the time slot TS(n+3)) the acknowledgement packet (indicated as "ACK" in FIG. 18) to the human interface device 130.

As shown in FIG. 18, in a next combined time slot (for example, TS(n+4) combined with TS(n+5)), the human interface device 130 may transmit (e.g. in the time slot TS(n+4)) a first input data and a first control information to the receiver device 120 and the human interface device 130 may then transmit (e.g. in the time slot TS(n+5)) a second input data (indicated as "$2^{nd}$ I" in FIG. 18) and a second control information (indicated as "2$^{nd}$ C" in FIG. 18) to the receiver device 120. The second control information may indicate that an acknowledgement of receipt of the input data is not required. The receiver device 120 may receive the first and second input data and the first and second control information from the human interface device 130. The receiver device 120 may not transmit the acknowledgement packet to the human interface device 130, and may scan one or more available channels, for example, less busy channels, or broadcast a signal about an identity of the receiver device 120.

As shown in FIG. 19, in some embodiments, N may be equal to 4. In a combined time slot (for example, TS(n−4) combined with TS(n−3), TS(n−2) and TS(n−1)), the human interface device 130 may transmit (e.g. in the time slot TS(n−4)) a first input data (indicated as "1$^{st}$ I" in FIG. 19) and a first control information (indicated as "1$^{st}$ C" in FIG. 19) to the receiver device 120, the human interface device 130 may then transmit (e.g. in the time slot TS(n−3)) a second input data (indicated as "2$^{nd}$ I" in FIG. 19) and a second control information (indicated as "2$^{nd}$ C" in FIG. 19) to the receiver device 120, the human interface device 130 may then transmit (e.g. in the time slot TS(n−2)) a third input data (indicated as "3$^{rd}$ I" in FIG. 19) and a third control information (indicated as "3$^{rd}$ C" in FIG. 19) to the receiver device 120, and the human interface device 130 may then transmit (e.g. in the time slot TS(n−1)) a fourth input data (indicated as "4$^{th}$ I" in FIG. 19) and a fourth control information (indicated as "4$^{th}$ C" in FIG. 19) to the receiver device 120. The fourth control information may indicate that an acknowledgement of receipt of the input data is required. The receiver device 120 may receive the first to fourth input data and the first to fourth control information from the human interface device 130, and transmit (e.g. in the time slot TS(n−1)) the acknowledgement packet (indicated as "ACK" in FIG. 19) to the human interface device 130.

As shown in FIG. 19, in a next combined time slot (for example, TS(n) combined with TS(n+1), TS(n+2) and TS(n+3)), the human interface device 130 may not transmit any input data nor control information to the receiver device 120. The receiver device 120 may scan one or more available channels, for example, less busy channels, or broadcast a signal about an identity of the receiver device 120.

As shown in FIG. 19, in a next combined time slot (for example, TS(n+4) combined with TS(n+5), TS(n+6) and TS(n+7)), the human interface device 130 may transmit (e.g. in the time slot TS(n+4)) a first input data (indicated as "1st I" in FIG. 19) and a first control information (indicated as "1$^{st}$ C" in FIG. 19) to the receiver device 120, the human interface device 130 may then transmit (e.g. in the time slot TS(n+5)) a second input data (indicated as "2$^{nd}$ I" in FIG. 19) and a second control information (indicated as "2$^{nd}$ C" in FIG. 19) to the receiver device 120, the human interface device 130 may then transmit (e.g. in the time slot TS(n+6)) a third input data (indicated as "3$^{rd}$ I" in FIG. 19) and a third control information (indicated as "3$^{rd}$ C" in FIG. 19) to the receiver device 120, and the human interface device 130 may then transmit (e.g. in the time slot TS(n+7)) a fourth input data (indicated as "4$^{th}$ I" in FIG. 19) and a fourth control information (indicated as "4$^{th}$ C" in FIG. 19) to the receiver device 120. The fourth control information may indicate that an acknowledgement of receipt of the input data is required. The receiver device 120 may receive the first to fourth input data and the first to fourth control information from the human interface device 130, and transmit (e.g. in the time slot TS(n−1)) the acknowledgement packet (indicated as "ACK" in FIG. 19) to the human interface device 130.

Figure 20:
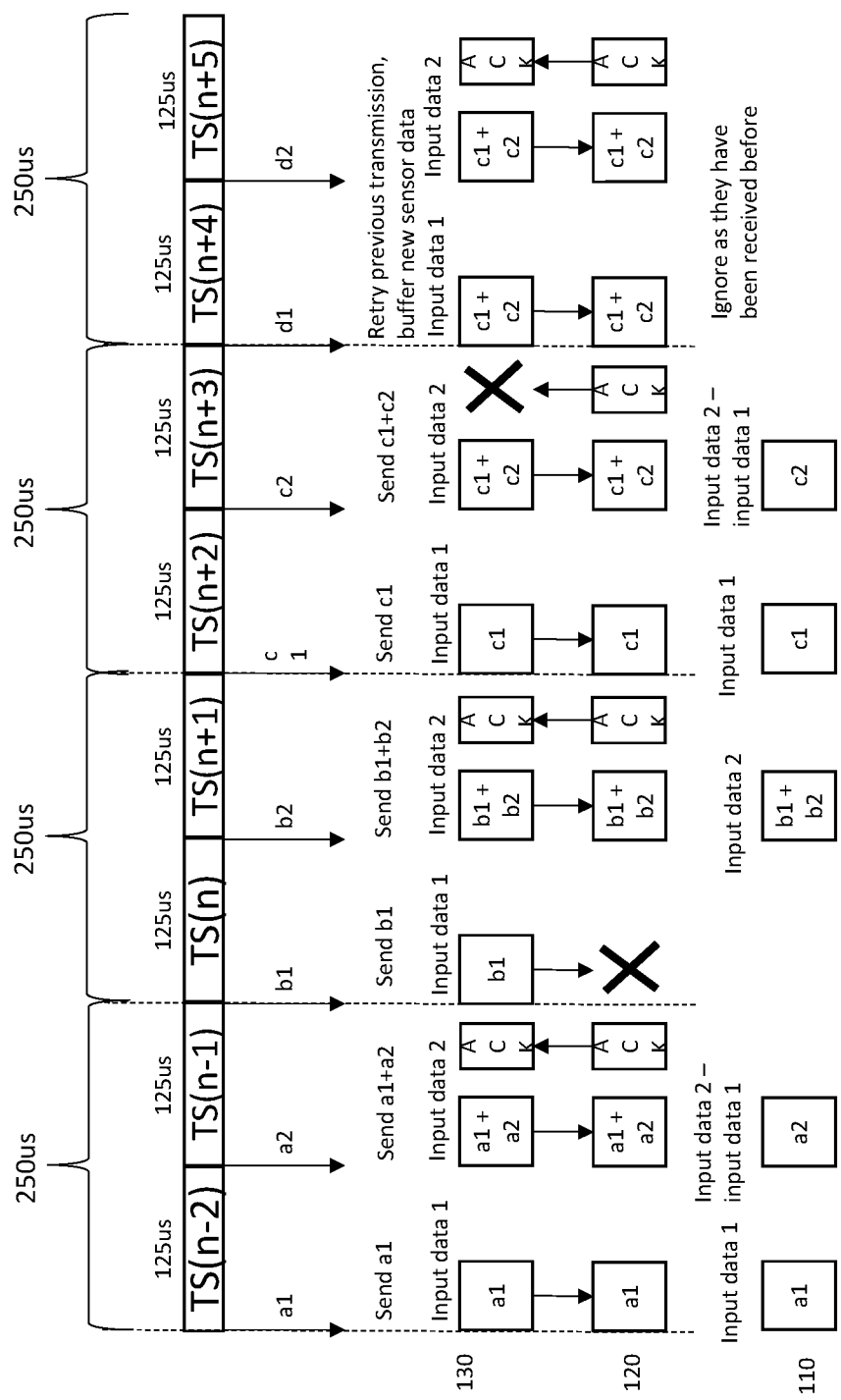
FIG. 20 shows another example time slot configuration showing interactions between a receiver device and a human interface device according to various embodiments.
Figure 21:
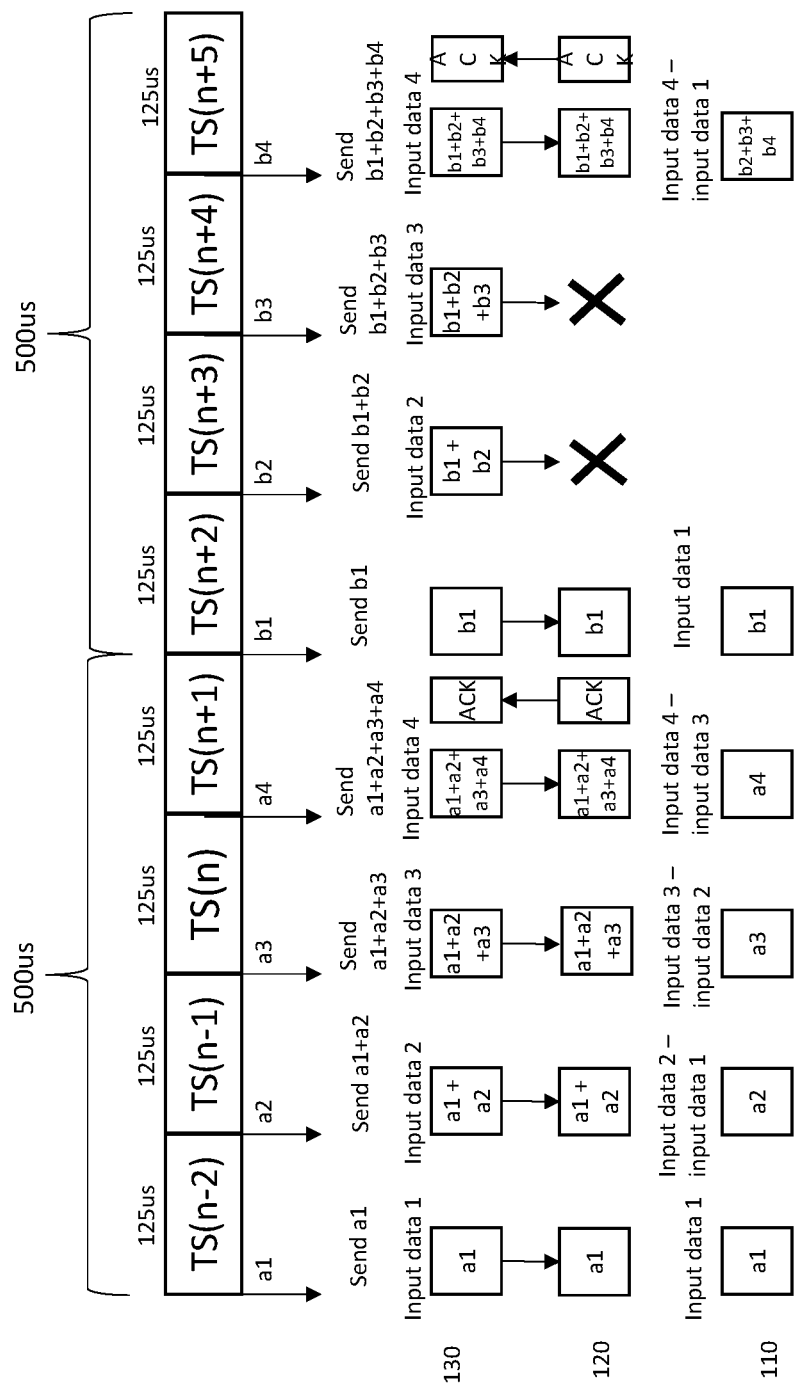
FIG. 21 shows another example time slot configuration showing interactions between a receiver device and a human interface device according to various embodiments.
Figure 22:
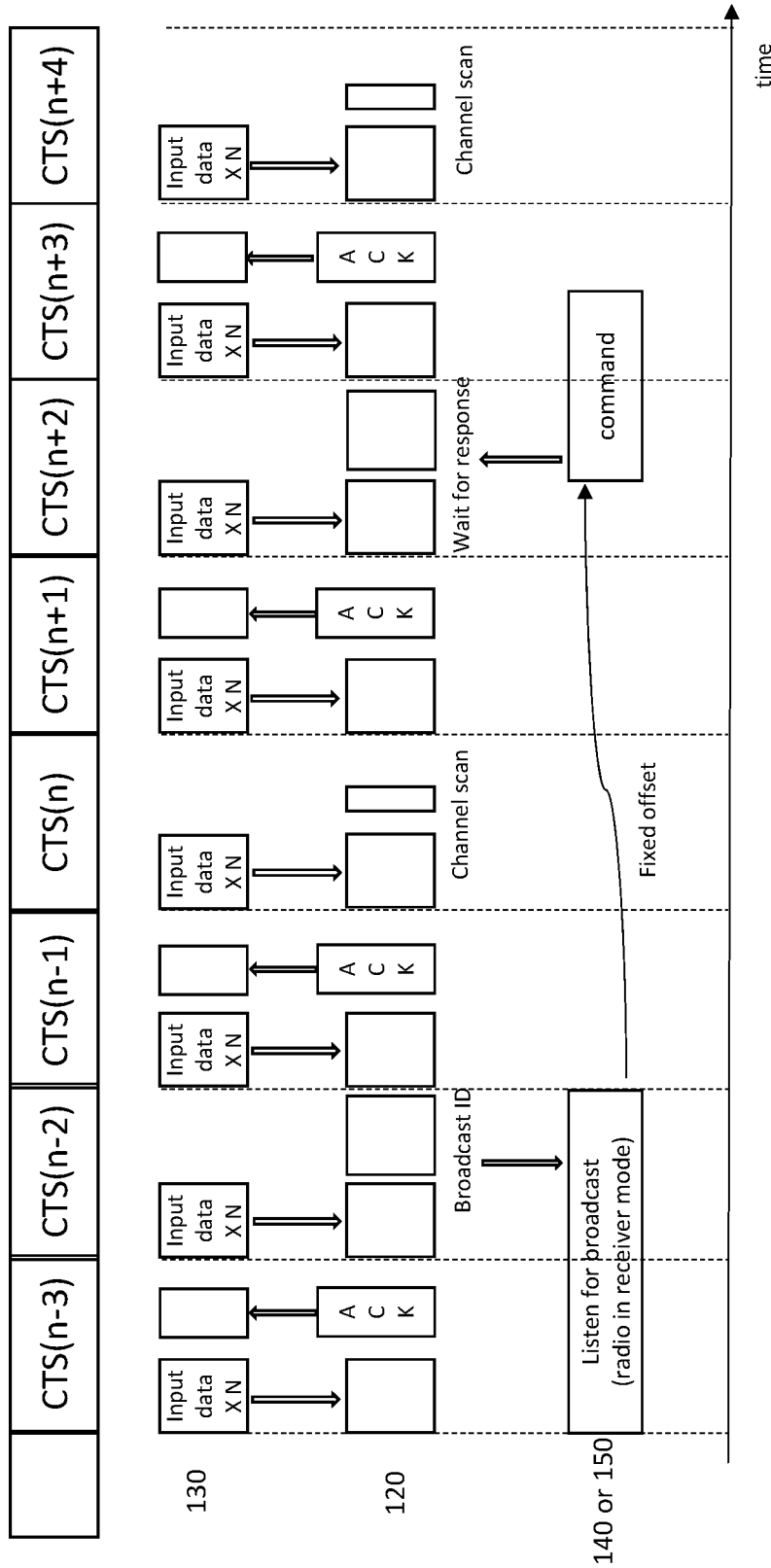
FIG. 22 shows another example time slot configuration showing interactions between a receiver device and a human interface device according to various embodiments.

FIGS. 20 and 21 show another example time slot configurations showing interactions between a receiver device and a human interface device according to various embodiments. FIG. 22 shows another example time slot configuration showing interactions between a receiver device and a human interface device according to various embodiments.

As shown in FIG. 20, in some embodiments, N may be equal to 2. The predetermined time interval may be 125 μs, but not limited thereto, and accordingly the combined predetermined time interval may be 250 μs. In a first combined time slot, the human interface device 130 may transmit (e.g. in the time slot TS(n−2)) a first input data (indicated as "a1" in FIG. 20) and a first control information (not shown) to the receiver device 120. The receiver device 120 may then receive the first input data a1 and transmit (e.g. in the time slot TS(n−2)) the first input data a1 to the host device 110. The receiver device 120 may also receive the first control information which may indicate that an acknowledgement of receipt of the input data is not required. Accordingly, the receiver device 120 may not send an acknowledgement packet to the human interface device 130.

The human interface device 130 may then transmit (e.g. in the time slot TS(n−1)) the first input data a1, a second input data (indicated as "a2" in FIG. 20) and a second control information (not shown) to the receiver device 120. That may mean the human interface device 130 may repeatedly send the first input data a1 to the receiver device 120 in the first combined time slot, for example, repeated N times. The second control information may indicate that an acknowledgement of receipt of the input data is required. In other words, the first input data a1 and the second input data a2 (i.e. as an end result of (a1+a2)) may be sent to the receiver device 120 in the time slot TS(n−1) and the second control information may indicate if an acknowledgement of receipt of the input data (i.e. the end result (a1+a2)) is required. The receiver device 120 may receive the first and second input data a1, a2 and the second control information from the human interface device 130, and transmit (e.g. in the time slot TS(n−1)) the acknowledgement packet (indicated as "ACK" in FIG. 20) to the human interface device 130. The receiver device 120 may also transmit (e.g. in the time slot TS(n−1)) the second input data a2 to the host device 110. That may mean the receiver device 120 may separate the first input data a1 from the received first and second input data a1, a2 and send the second input data a2 to the host device 110.

As shown in FIG. 20, in a second combined time slot, the human interface device 130 may transmit (e.g. in the time slot TS(n)) a first input data (indicated as "b1" in FIG. 20) and a first control information (not shown) to the receiver device 120. A transmission failure (denoted as "X" in FIG. 20) may occur (e.g. the transmission of the first input data b1 and the first control information is unsuccessful). The receiver 120 may not receive the first input data b1 and, accordingly, will not send acknowledgement to the human interface device 130.

The human interface device 130 may then transmit (e.g. in the time slot TS(n+1)) the first input data b1, a second input data (indicated as "b2" in FIG. 20) and a second control information (not shown) to the receiver device 120. That may mean the human interface device 130 may also repeatedly send the first input data b1 to the receiver device 120 in the second combined time slot, for example, repeated N times. The second control information may indicate that an acknowledgement of receipt of the input data is required. The receiver device 120 may receive the first and second input data b1, b2 and the second control information from the human interface device 130, and transmit (e.g. in the time slot TS(n+1)) the acknowledgement packet (indicated as "ACK" in FIG. 20) to the human interface device 130. The receiver device 120 may also transmit (e.g. in the time slot TS(n+1)) the first and second input data b1, b2 to the host device 110.

As shown in FIG. 20, in a third combined time slot, the human interface device 130 may transmit (e.g. in the time slot TS(n+2)) a first input data (indicated as "c1" in FIG. 20) and a first control information (not shown) to the receiver device 120. The receiver device 120 may then receive the first input data c1 and transmit (e.g. in the time slot TS(n+2)) the first input data c1 to the host device 110. The receiver device 120 may also receive the first control information which may indicate that an acknowledgement of receipt of the input data is not required. Accordingly, the receiver device 120 may not send an acknowledgement packet to the human interface device 130.

The human interface device 130 may then transmit (e.g. in the time slot TS(n+3)) the first input data c1, a second input data (indicated as "c2" in FIG. 20) and a second control information (not shown) to the receiver device 120. That may mean the human interface device 130 may repeatedly send the first input data c1 to the receiver device 120 in the third combined time slot, for example, repeated N times. The second control information may indicate that an acknowledgement of receipt of the input data is required. The receiver device 120 may receive the first and second input data c1, c2 and the second control information from the human interface device 130. The receiver device 120 may also transmit (e.g. in the time slot TS(n+3)) the second input data c2 to the host device 110. That may mean the receiver device 120 may separate the first input data c1 from the received first and second input data c1, c2 and send the second input data c2 to the host device 110. The receiver device 120 may transmit an acknowledgement packet (indicated as "ACK" in FIG. 20) to the human interface device 130 (e.g. in the time slot TS(n+3)). A transmission failure (denoted as "X" in FIG. 20) may occur and the human interface device 130 may not receive the acknowledgement packet from the receiver device 120.

As shown in FIG. 20, in a fourth combined time slot, the human interface device 130 may receive a first input data d1. The human interface device 130 may re-transmit (e.g. in the time slot TS(n+4)) the previous first and second input data c1, c2 to the host device 110 while buffering for the first input data d1. The receiver device 120 may receive the previous first and second input data c1, c2 and ignore them as the receiver device 120 may have transmitted the previous first and second input data c1, c2 to the host device 110. The human interface device 130 may receive a first input data d1. The human interface device 130 may again re-transmit (e.g. in the time slot TS(n+5)) the previous first and second input data c1, c2 to the host device 110 while buffering for the first and/or second input data d1, d2. The receiver device 120 may again receive the previous first and second input data c1, c2 and again ignore them as the receiver device 120 may have transmitted the previous first and second input data c1, c2 to the host device 110.

As shown in FIG. 21, in some embodiments, N may be equal to 4. The predetermined time interval may be 125 μs, but not limited thereto, and accordingly the combined predetermined time interval may be 500 μs. In a first combined time slot, the human interface device 130 may transmit (e.g. in the time slot TS(n−2)) a first input data (indicated as "a1" in FIG. 21) and a first control information (not shown) to the receiver device 120. The receiver device 120 may then receive the first input data a1 and transmit (e.g. in the time slot TS(n−2)) the first input data a1 to the host device 110. The receiver device 120 may also receive the first control information which may indicate that an acknowledgement of receipt of the input data is not required. Accordingly, the receiver device 120 may not send an acknowledgement packet to the human interface device 130.

The human interface device 130 may then transmit (e.g. in the time slot TS(n−1)) the first input data a1, a second input data (indicated as "a2" in FIG. 21) and a second control information (not shown) to the receiver device 120. That may mean the human interface device 130 may repeatedly send the first input data a1 to the receiver device 120 in the first combined time slot, that is, for N=4, k=1, repeated four times (i.e. (N+1−k)). In other words, the first input data a1 may be repeatedly sent by the human interface device 130 to the receiver device 120 in the present time slot when the first input data is generated by the human interface device 130 for user input and every subsequent time slot of the combined time slot. The second control information may indicate that an acknowledgement of receipt of the input data is not required. The receiver device 120 may receive the first and second input data a1, a2 and the second control information from the human interface device 130. Accordingly, the receiver device 120 may not send an acknowledgement packet to the human interface device 130. The receiver device 120 may transmit (e.g. in the time slot TS(n−1)) the second input data a2 to the host device 110. That may mean the receiver device 120 may separate the first input data a1 from the received first and second input data a1, a2 and send the second input data a2 to the host device 110.

The human interface device 130 may further transmit (e.g. in the time slot TS(n)) the first and second input data a1, a2, a third input data (indicated as "a3" in FIG. 21) and a third control information (not shown) to the receiver device 120. That may mean the human interface device 130 may also repeatedly send the second input data a2 to the receiver device 120 in the first combined time slot, that is, for N=4, k=2, repeated three times (i.e. (N+1−k)). In other words, the second input data a2 may be repeatedly sent by the human interface device 130 to the receiver device 120 in the present time slot when the second input data is generated by the human interface device 130 for user input and every subsequent time slot of the combined time slot. The third control information may indicate that an acknowledgement of receipt of the input data is not required. The receiver device 120 may receive the first to third input data a1, a2, a3 and the third control information from the human interface device 130. Accordingly, the receiver device 120 may not send an acknowledgement packet to the human interface device 130. The receiver device 120 may transmit (e.g. in the time slot TS(n)) the third input data a3 to the host device 110. That may mean the receiver device 120 may separate the first and second input data a1, a2 from the received first to third input data a1, a2, a3 and send the third input data a3 to the host device 110.

The human interface device 130 may further transmit (e.g. in the time slot TS(n+1)) the first to third input data a1, a2, a3, a fourth input data (indicated as "a4" in FIG. 21) and a fourth control information (not shown) to the receiver device 120. That may mean the human interface device 130 may also repeatedly send the third input data a3 to the receiver device 120 in the first combined time slot, that is, for N=4, k=3, repeated two times (i.e. (N+1−k)). In other words, the third input data a3 may be repeatedly sent by the human interface device 130 to the receiver device 120 in the present time slot when the third input data is generated by the human interface device 130 for user input and every subsequent time slot of the combined time slot. The fourth control information may indicate that an acknowledgement of receipt of the input data is required. The receiver device 120 may receive the first to fourth input data a1, a2, a3, a4 and the fourth control information from the human interface device 130 and transmit (e.g. in the time slot TS(n+1)) the acknowledgement packet (indicated as "ACK" in FIG. 21) to the human interface device 130. The receiver device 120 may transmit (e.g. in the time slot TS(n+1)) the fourth input data a4 to the host device 110. That may mean the receiver device 120 may separate the first to third input data a1, a2, a3 from the received first to fourth input data a1, a2, a3, a4 and send the fourth input data a4 to the host device 110. In other words, the receiver device 120 may separate the fourth input data a4 from the received first to fourth input data a1, a2, a3, a4 and send the fourth input data a4 to the host device 110.

As shown in FIG. 21, in a second combined time slot, the human interface device 130 may transmit (e.g. in the time slot TS(n+2)) a first input data (indicated as "b1" in FIG. 21) and a first control information (not shown) to the receiver device 120. The receiver device 120 may then receive the first input data b1 and transmit (e.g. in the time slot TS(n+2)) the first input data b1 to the host device 110. The receiver device 120 may also receive the first control information which may indicate that an acknowledgement of receipt of the input data is not required. Accordingly, the receiver device 120 may not send an acknowledgement packet to the human interface device 130. The human interface device 130 may then transmit (e.g. in the time slot TS(n+3)) the first input data b1, a second input data (indicated as "b2" in FIG. 21) and a second control information (not shown) to the receiver device 120. That may mean the human interface device 130 may repeatedly send the first input data b1 to the receiver device 120 in the second combined time slot, as described herein. The second control information may indicate that an acknowledgement of receipt of the input data is required or not required). A transmission failure (denoted as "X" in FIG. 21) may occur (e.g. the transmission of the first input data b1, the second input data b2, and the second control information is unsuccessful). The receiver 120 may not receive the first and second input data b1, b2 and the second control information from human interface device 130 at the present time interval (e.g in the time slot TS(n+3)).

The human interface device 130 may further transmit (e.g. in the time slot TS(n+4)) the first and second input data b1, b2, a third input data (indicated as "b3" in FIG. 21) and a third control information (not shown) to the receiver device 120. That may mean the human interface device 130 may also repeatedly send the second input data b2 to the receiver device 120 in the second combined time slot, as described herein. The third control information may indicate that an acknowledgement of receipt of the input data is required or not required. A transmission failure (denoted as "X" in FIG. 21) may occur (e.g. the transmission of the first to third input data b1, b2, b3, and the third control information is unsuccessful). The receiver 120 may not receive the first, second and third input data b1, b2, b3 and the third control information from human interface device 130 at the present time interval (e.g. in the time slot TS(n+4)).

The human interface device 130 may further transmit (e.g. in the time slot TS(n+5)) the first to third input data b1, b2, b3, a fourth input data (indicated as "b4" in FIG. 21) and a fourth control information (not shown) to the receiver device 120. That may mean the human interface device 130 may also repeatedly send the third input data b3 to the receiver device 120 in the second combined time slot, as described herein. The fourth control information may indicate that an acknowledgement of receipt of the input data is required. The receiver device 120 may receive the first to fourth input data b1, b2, b3, b4 and the fourth control information from the human interface device 130 and transmit (e.g. in the time slot TS(n+5)) the acknowledgement packet (indicated as "ACK" in FIG. 21) to the human interface device 130. The receiver device 120 may collectively transmit (e.g. in the time slot TS(n+5)) the second to fourth input data b2, b3, b4 to the host device 110. That may mean the receiver device 120 may separate the first input data b1 from the received first to fourth input data b1, b2, b3, b4 and send the second to fourth input data b2, b3, b4 to the host device 110. In other words, the receiver device 120 may separate the second to fourth input data b2, b3, b4 from the received first to fourth input data b1, b2, b3, b4 and send the fourth input data b4 to the host device 110.

As shown in FIG. 22, in some embodiments, the human interface device 130 may request an acknowledgement of receipt of the input data to the receiver device 120 every other combined time slot, as indicated in a last control information associated with a last input data of the first to N input data transmitted in the every other combined time slot In the combined time slots (for example, as indicated as CTS(n−3) and CTS(n−2)), a another receiver device 140 or a another human interface device 150 may listen for broadcasting. In the combined time slot (for example, CTS(n−2)), the another receiver device 140 or the another human interface device 150 may detect the receiver device 120 by the broadcasted signal. Thereafter, in the later combined time slot (for example, CTS(n+2)), the another receiver device 140 or the another human interface device 150 may transmit the command to the receiver device 120. For example, the another receiver device 140 may transmit a command for disconnecting the receiver device 120 from the human interface device 130 to the receiver device 120. As another example, the another human interface device 150 may transmit a command for a request for a connection to the receiver device 120.

As shown in FIG. 22, a broadcast message communication may be carried out once every certain number of combined time slots, according to a fixed offset similarly as described with reference to FIG. 9. In FIG. 22, the fixed offset value may also be four (4) (i.e. a difference between the second combined time slot (for example, CTS(n−2)) and the sixth combined time slot (for example, CTS(n+2))), which means that the broadcast message communication is carried out once every four (4) time slots.

In other embodiments, a first time slot (for example, CTS(n−3)) may not be used for an acknowledgement, but to send a broadcast message or scan the RSSI for one or more available channels. A second combined time slot (for example, CTS(n−2)) may not be used to send a broadcast message, but for an acknowledge. A third and subsequent combined time slots (for example, CTS(n−1) to CTS (n+4)) may also be used for other radio activities other than the ones shown in FIG. 22. A sequence of radio activities may be programmed in control information associated with input data that is to be transmitted by the human interface device 130. Accordingly, the fixed offset may be predetermined or adjusted when required to determine the sequence of radio activities.

Figure 23:
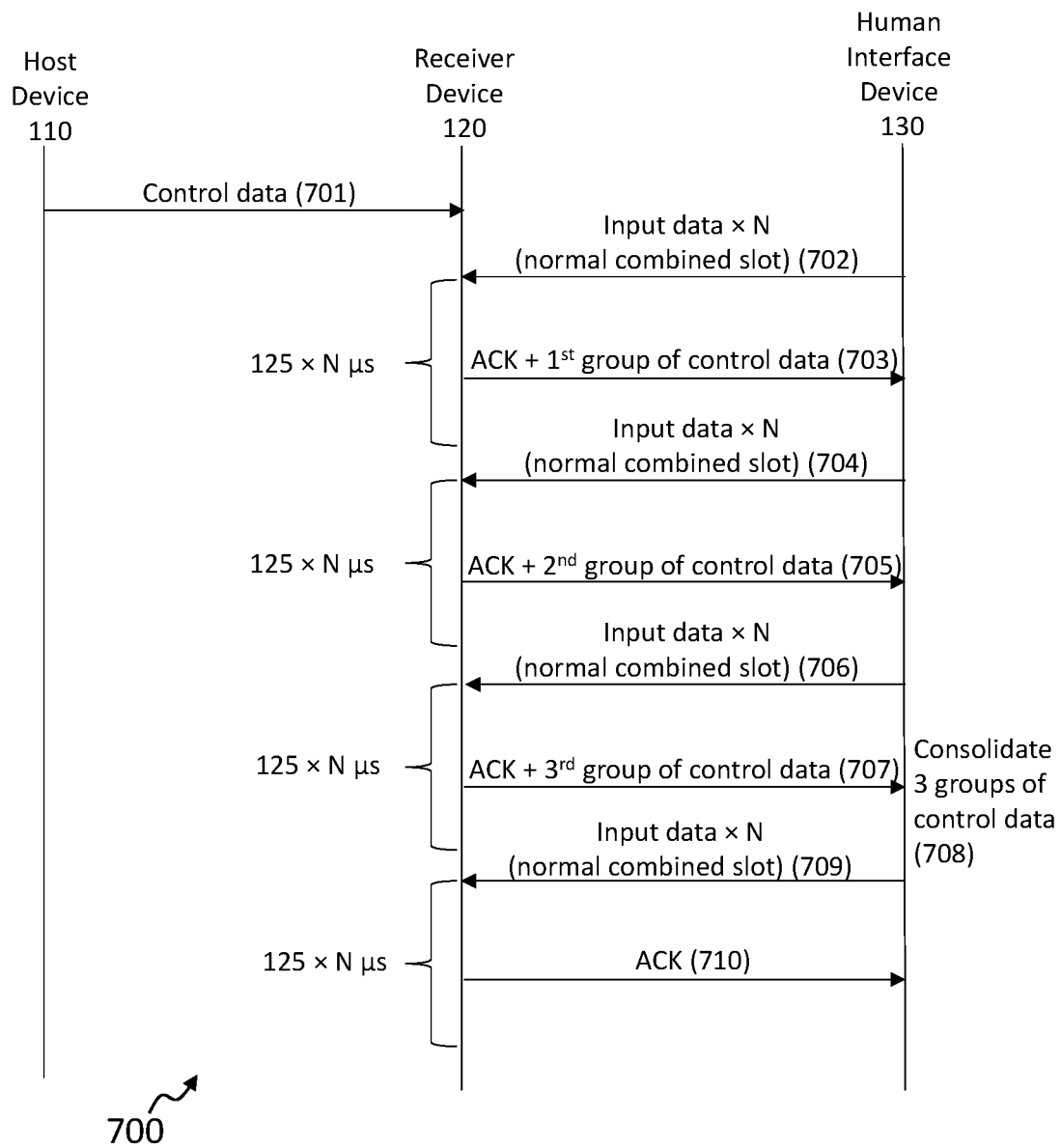
FIG. 23 shows another sequence diagram showing a method including interactions between a receiver device and a human interface device according to various embodiments.
Figure 24:
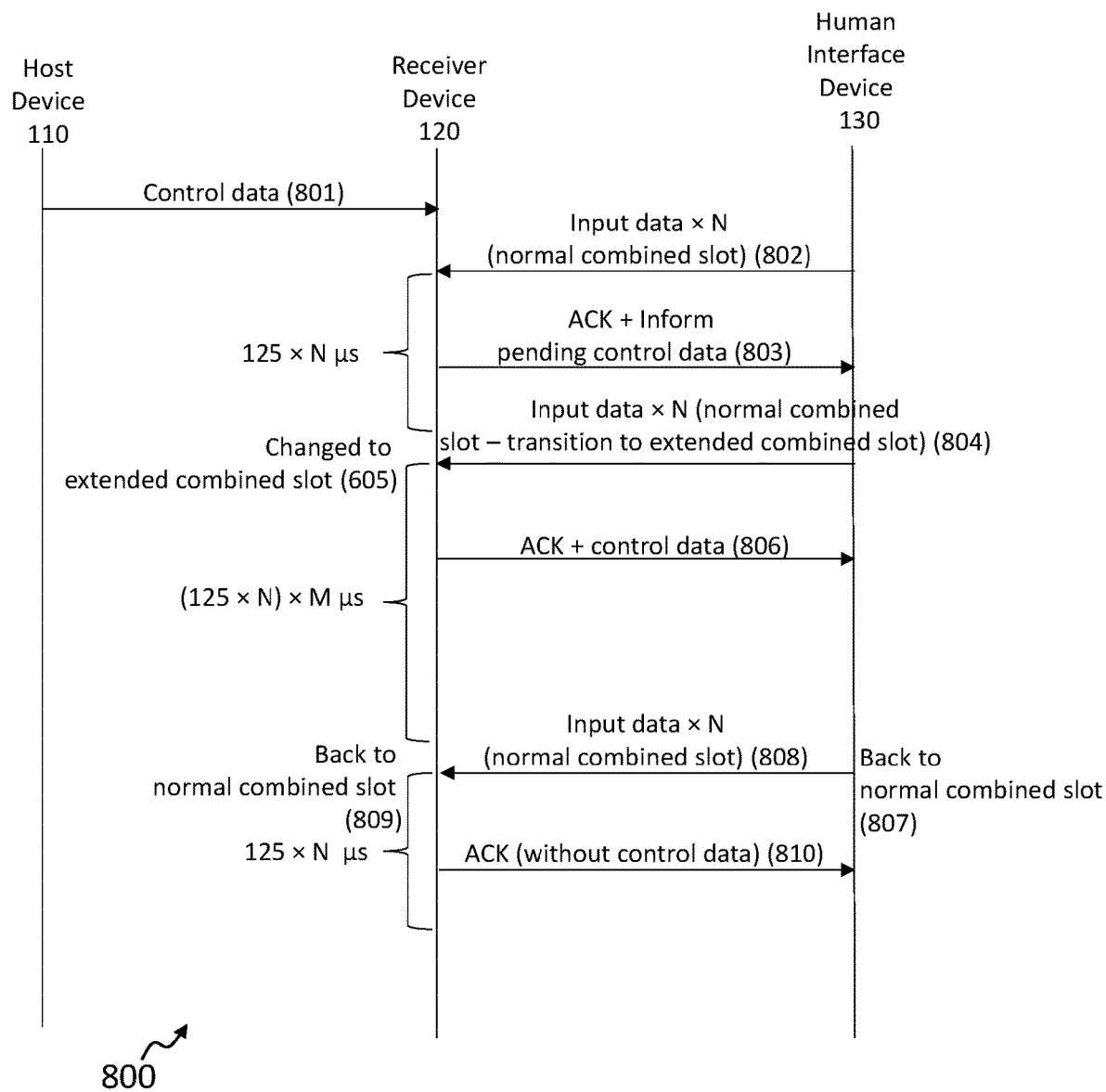
FIG. 24 shows another sequence diagram showing a method including interactions between a receiver device and a human interface device according to various embodiments.

FIG. 23 shows another sequence diagram showing a method 700 including interactions between a receiver device 120 and a human interface device 130 according to various embodiments. According to various embodiments, the method 700 for facilitating a data communication is provided. FIG. 24 shows another sequence diagram showing a method 800 including interactions between a receiver device 120 and a human interface device 130 according to various embodiments. According to various embodiments, the method 800 for facilitating a data communication is provided.

Features that are described in the context of the methods 500, 600 may correspondingly be applicable to the same or similar features in the methods 700, 800 as shown in FIGS. 23 and 24, respectively. Furthermore, additions and/or combinations and/or alternatives as described for a feature in the context of the methods 500, 600 may correspondingly be applicable to the same or similar feature in the methods 700, 800 as shown in FIGS. 23 and 24.

As shown in FIG. 23, in some embodiments, the method 700 may include a step 701 of which the host device 110 transmits control data for controlling the human interface device 130 to the receiver device 120.

In some embodiments, as described with reference to FIG. 23, the receiver device 120 may split the control data into a plurality of groups of the control data, for example three (3) groups of the control data (hereinafter, referred to as a "first group of the control data", a "second group of the control data" and a "third group of the control data"). In some embodiments, the receiver device 120 may split the control data into the plurality of groups of the control data, if a size of the control data exceeds a predetermined size.

In some embodiments, the method 700 may include a step 702 of which the human interface device 130 transmits first to N-th input data and first to N-th control information (not shown) to the receiver device 120 in a first combined time slot combined from first to N-th time slots (e.g. as described with reference to FIGS. 16 to 22). In some embodiments, the first to N-th control information may indicate whether an acknowledgement of receipt of the input data is required. For example, the first to (N−1)-th control information may indicate that an acknowledgement of receipt of the input data is not required and the N-th control information may indicate that an acknowledgement of receipt of the input data is required. In some embodiments, the method 700 may include a step 703 of which the receiver device 120 transmits an acknowledgement packet and the first group of the control data to the human interface device 130 in the N-th time slot of the first combined time slot.

In some embodiments, the method 700 may include a step 704 of which the human interface device 130 transmits first to N-th input data and first to N-th control information (not shown) to the receiver device 120 in a second combined time slot combined from first to N-th time slots as described herein. In some embodiments, the first to N-th control information may indicate whether an acknowledgement of receipt of the input data is required. For example, the first to (N−1)-th control information may indicate that an acknowledgement of receipt of the input data is not required and the N-th control information may indicate that an acknowledgement of receipt of the input data is required. In some embodiments, the method 700 may include a step 705 of which the receiver device 120 transmits an acknowledgement packet and the second group of the control data to the human interface device 130 in the N-th time slot of the second combined time slot.

In some embodiments, the method 700 may include a step 706 of which the human interface device 130 transmits first to N-th input data and first to N-th control information (not shown) to the receiver device 120 in a third combined time slot combined from first to N-th time slots as described herein. In some embodiments, the first to N-th control information may indicate whether an acknowledgement of receipt of the input data is required. For example, the first to (N−1)-th control information may indicate that an acknowledgement of receipt of the input data is not required and the N-th control information may indicate that an acknowledgement of receipt of the input data is required. In some embodiments, the method 700 may include a step 707 of which the receiver device 120 transmits an acknowledgement packet and the third group of the control data to the human interface device 130 in the N-th time slot of the third combined time slot.

In some embodiments, the method 700 may include a step 708 of which the human interface device 130 consolidates the first group, the second group and the third group of the control data. Although not shown, the human interface device 130 may control one or more components of the human interface device 130, for example, each light source of the plurality of light sources, based on the consolidated control data.

In some embodiments, the method 700 may include a step 709 of which the human interface device 130 transmits first to N-th input data and first to N-th control information (not shown) to the receiver device 120 in a fourth combined time slot combined from first to N-th time slots as described herein. In some embodiments, the first to N-th control information may indicate whether an acknowledgement of receipt of the input data is required. For example, the first to (N−1)-th control information may indicate that an acknowledgement of receipt of the input data is not required and the N-th control information may indicate that an acknowledgement of receipt of the input data is required. In some embodiments, the method 700 may include a step 710 of which the receiver device 120 transmits an acknowledgement packet to the human interface device 130 in the N-th time slot of the fourth combined time slot.

In some embodiments, transmitting the control data with the acknowledgement packet from the receiver device 120 to the human interface device 130 may be performed at a predetermined time interval. For example, as shown in FIG. 23, the predetermined time interval may be 125 μs, but not be limited thereto.

As shown in FIG. 24, in some embodiments, the method 800 may include a step 801 of which the host device 110 transmits control data for controlling the human interface device 130 to the receiver device 120.

In some embodiments, the method 800 may include a step 802 of which the human interface device 130 transmits first to N-th input data and first to N-th control information (not shown) to the receiver device 120 in a first combined time slot combined from first to N-th time slots (e.g. as described with reference to FIGS. 16 to 22). In some embodiments, the first to N-th control information may indicate whether an acknowledgement of receipt of the input data is required. For example, the first to (N−1)-th control information may indicate that an acknowledgement of receipt of the input data is not required and the N-th control information may indicate that an acknowledgement of receipt of the input data is required.

In some embodiments, if a size of the control data exceeds a predetermined size, the receiver device 120 may not be able to transmit the control data to the human interface device 130 during a combined predetermined time interval. As an example, the predetermined time interval may be (125×N) μs. In this regard, the receiver device 120 may inform the human interface device 130 of pending control data.

In some embodiments, the method 800 may include a step 803 of which the receiver device 120 transmits an acknowledgement packet to the human interface device 130 and informs the human interface device 130 of the pending control data.

In some embodiments, the method 800 may include a step 804 of which the human interface device 130 transmits first to N-th input data and first to N-th control information (not shown) to the receiver device 120 in a second combined time slot combined from first to N-th time slots as described herein. In some embodiments, the first to N-th control information may indicate whether an acknowledgement of receipt of the input data is required. For example, the first to (N−1)-th control information may indicate that an acknowledgement of receipt of the input data is not required and the N-th control information may indicate that an acknowledgement of receipt of the input data is required. In the step 804, the human interface device 130 extends the combined predetermined time interval (e.g. to ((125×N) λM) M is an integer).

In some embodiments, the method 800 may include a step 805 of which the receiver device 120 changes to the extended combined time interval.

In some embodiments, the method 800 may include a step 806 of which the receiver device 120 transmits an acknowledgement packet and the control data to the human interface device 130 during the extended combined time interval. As an example, the extended combined time interval may be 500 μs (e.g. N=2, M=2).

In some embodiments, the method 800 may include a step 807 of which the human interface device 130 returns the extended combined time interval, for example, 500 μs, to the combined predetermined time interval, for example, 250 μs.

In some embodiments, the method 800 may include a step 808 of which the human interface device 130 transmits first to N-th input data and first to N-th control information (not shown) to the receiver device 120 in a third combined time slot combined from first to N-th time slots as described herein. In some embodiments, the first to N-th control information may indicate whether an acknowledgement of receipt of the input data is required. For example, the first to (N−1)-th control information may indicate that an acknowledgement of receipt of the input data is not required and the N-th control information may indicate that an acknowledgement of receipt of the input data is required.

In some embodiments, the method 800 may include a step 809 of which the receiver device 120 returns the extended combined time interval, for example, 500 μs, to the combined predetermined time interval, for example, 250 μs.

In some embodiments, the method 800 may include a step 810 of which the receiver device 120 transmits an acknowledgement packet (for example, without control data) to the human interface device 130 during the third combined predetermined time interval, for example, 250 μs.

While the method described above is illustrated and described as a series of steps or events, it will be appreciated that any ordering of such steps or events are not to be interpreted in a limiting sense. For example, some steps may occur in different orders and/or concurrently with other steps or events apart from those illustrated and/or described herein. In addition, not all illustrated steps may be required to implement one or more aspects or embodiments described herein. Also, one or more of the steps depicted herein may be carried out in one or more separate acts and/or phases.

The following examples pertain to further embodiments.

Example 1 is a system for facilitating a data communication, including: a human interface device; a receiver device couplable to a host device and communicatively connectable to the human interface device, wherein the human interface device is configured to generate input data for a user input on the human interface device, generate control information associated with the input data, and transmit the input data and the control information to the receiver device, wherein the control information indicates whether an acknowledgement of receipt of the input data is required, and wherein the receiver device is configured to receive the input data and the control information from the human interface device and transmit the input data to the host device, and the receiver device is further configured to transmit an acknowledgement packet to the human interface device when the control information received from the human interface device indicates that an acknowledgement of receipt of the input data is required, and perform a background task when the control information received from the human interface device indicates that an acknowledgement of receipt of the input data is not required.

In example 2, the subject-matter of example 1 may further include that the human interface device is configured to transmit the input data and the control information to the receiver device at a predetermined time interval.

In example 3, the subject-matter of example 1 may further include that the receiver device is configured to receive control data for controlling the human interface device from the host device, and wherein when the control information received from the human interface device indicates that an acknowledgement of receipt of the input data is required, the receiver device is configured to transmit the control data with the acknowledgement packet to the human interface device.

In example 4, the subject-matter of example 2 may further include that the receiver device is configured to receive control data for controlling the human interface device from the host device, and wherein if a size of the control data exceeds a predetermined size, the receiver device is configured to inform the human interface device of the control data at the predetermined time interval, and wherein the human interface device is configured to extend the predetermined time interval, so as to enable the receiver device to transmit the control data exceeding the predetermined size to the human interface device during the extended time interval.

In example 5, the subject-matter of example 4 may further include that the human interface device is further configured to return from the extended time interval to the predetermined time interval, after receiving the control data exceeding the predetermined size.

In example 6, the subject-matter of example 3 may further include that the receiver device is configured to split the control data into a plurality of groups of the control data, and sequentially transmit each group of the plurality of groups of the control data to the human interface device.

In example 7, the subject-matter of example 6 may further include that the human interface device includes a plurality of light sources, and each light source of the plurality of light sources is capable of selectively producing a plurality of lighting colours, and that the control data includes data for controlling the each light source to produce at least one predetermined lighting colour among the plurality of lighting colours.

In example 8, the subject-matter of example 1 may further include that when the control information received from the human interface device indicates that an acknowledgement of receipt of the input data is not required, the receiver device is configured to perform one of scanning one or more available channels and broadcasting a signal about an identity of the receiver device.

In example 9, the subject-matter of example 8 may further include that the receiver device is configured to perform scanning the one or more available channels in a vicinity of the receiver device, detect radio energy of the one or more available channels, compute an average of the detected radio energy, and select a channel based on the computed average.

In example 10, the subject-matter of example 8 may further include another receiver device, wherein the another receiver device is configured to detect the receiver device by the broadcasted signal, and transmit a command for disconnecting the receiver device from the human interface device to the receiver device, and wherein the receiver device is configured to receive the command and disconnect from the human interface device.

In example 11, the subject-matter of example 10 may further include that after the receiver device disconnects from the human interface device, the another receiver device is configured to establish a new wireless connection with the human interface device.

In example 12, the subject-matter of example 8 may further include another human interface device, wherein the another human interface device is configured to detect the receiver device by the broadcasted signal, and transmit a command for a request for a connection to the receiver device, and wherein the receiver device is configured to receive the command and disconnect from the human interface device.

In example 13, the subject-matter of example 12 may further include that after the receiver device disconnects from the human interface device, the receiver device is configured to establish a new wireless connection with the another human interface device.

In example 14, the subject-matter of example 1 may further include that when the control information received from the human interface device indicates that an acknowledgement of receipt of the input data is not required, the human interface device is configured to operate in a power saving mode.

In example 15, the subject-matter of example 2 may further include that the predetermined time interval is 125 μs and consequently a polling rate of the human interface device is 8000 Hz.

In example 16, the subject-matter of example 2 may further include that first to N-th predetermined time intervals are combined as a combined predetermined time interval, wherein at the first to (N−1)-th predetermined time intervals, first to (N−1)-th control information associated with first to (N−1)-th input data indicate that an acknowledgement of receipt of the first to (N−1)-th input data is not required from the receiver, and wherein at the N-th predetermined time interval, the receiver device is configured to transmit an acknowledgement packet to the human interface device when N-th control information associated with N-th input data indicates that an acknowledgement of receipt of the N-th input data is required, and perform a background task when the N-th control information received from the human interface device indicates that an acknowledgement of receipt of the N-th input data is not required.

In example 17, the subject-matter of example 16 may further include that for each k, 1≤k≤N, the human interface device is configured to transmit the first to k-th input data and the first to k-th control information associated with the first to k-th input data to the receiver device at the k-th predetermined time interval, and wherein the receiver device is configured to transmit the k-th input data to the host device at the k-th predetermined time interval, or wherein the receiver device is configured to transmit the first to k-th input data to the host device at the N-th predetermined time interval.

In example 18, the subject-matter of example 16 may further include that N is equal to 2 or 4 or any even integer.

Example 19 is a method for facilitating a data communication, the method including: generating, by a human interface device, input data for a user input on the human interface device; generating, by the human interface device, control information associated with the input data, wherein the control information indicates whether an acknowledgement of receipt of the input data is required; transmitting the input data and the control information from the human interface device to a receiver device, wherein the receiver device is communicatively connected to the human interface device; and transmitting an acknowledgement packet from the receiver device to the human interface device, when the control information received from the human interface device indicates that an acknowledgement of receipt of the input data is required, and performing, by the receiver device, a background task, when the control information received from the human interface device indicates that an acknowledgement of receipt of the input data is not required.

In example 20, the subject-matter of example 19 may further include that transmitting the input data and the control information from the human interface device to the receiver device includes: transmitting the input data and the control information to the receiver device at a predetermined time interval.

In example 21, the subject-matter of example 19 may further include receiving, by the receiver device, control data for controlling the human interface device from the host device, and transmitting the control data with the acknowledgement packet to the human interface device, wherein when the control information received from the human interface device indicates that an acknowledgement of receipt of the input data is required.

In example 22, the subject-matter of example 20 may further include receiving, by the receiver device, control data for controlling the human interface device from the host device; if a size of the control data exceeds a predetermined size, informing, by the receiver device, the human interface device of the control data at the predetermined time interval; and extending, by the human interface device, the predetermined time interval, so as to enable the receiver device to transmit the control data exceeding the predetermined size to the human interface device during the extended time interval.

In example 23, the subject-matter of example 22 may further include returning, by the human interface device, from the extended time interval to the predetermined time interval, after receiving the control data exceeding the predetermined size.

In example 24, the subject-matter of example 21 may further include splitting, by the receiver device, the control data into a plurality of groups of the control data; and sequentially transmitting each group of the plurality of groups of the control data from the receiver device to the human interface device.

In example 25, the subject-matter of example 19 may further include if the control information received from the human interface device indicates that an acknowledgement of receipt of the input data is not required, performing, by the receiver device, one of scanning one or more available channels and broadcasting a signal about an identity of the receiver device.

In example 26, the subject-matter of example 25 may further include performing, by the receiver device, scanning the one or more available channels in a vicinity of the receiver device; detecting, by the receiver device, radio energy of the one or more available channels;
computing, by the receiver device, an average of the detected radio energy; and
selecting, by the receiver device, a channel based on the computed average.

In example 27, the subject-matter of example 25 may further include detecting, by another receiver device, the receiver device by the broadcasted signal; transmitting, by the another receiver device, a command for disconnecting the receiver device from the human interface device to the receiver device; and disconnecting the receiver device from the human interface device.

In example 28, the subject-matter of example 27 may further include after the receiver device disconnects from the human interface device, establishing the new wireless connection between the human interface device and the another receiver device.

In example 29, the subject-matter of example 25 may further include detecting, by another human interface device, the receiver device by the broadcasted signal; transmitting, by the another human interface device, a command for a request for a connection to the receiver device; and disconnecting the receiver device from the human interface device.

In example 30, the subject-matter of example 29 may further include after the receiver device disconnects from the human interface device, establishing the new wireless connection between the receiver device and the new human interface device.

In example 31, the subject-matter of example 19 may further include if the control information received from the human interface device indicates that an acknowledgement of receipt of the input data is not required, controlling the human interface device to operate in a power saving mode.

In example 32, the subject-matter of example 19 may further include that the predetermined time interval is 125 μs and consequently a polling rate of the human interface device is 8000 Hz.

In example 33, the subject-matter of example 20 may further include that first to N-th predetermined time intervals are combined as a combined predetermined time interval, and wherein at the first to (N−1)-th predetermined time intervals, first to (N−1)-th control information associated with first to (N−1)-th input data indicate that an acknowledgement of receipt of the first to (N−1)-th input data is not required from the receiver, the method further including: at the N-th predetermined time interval, transmitting, by the receiver device, an acknowledgement packet to the human interface device when N-th control information associated with N-th input data indicates that an acknowledgement of receipt of the N-th input data is required, and performing a background task when the N-th control information received from the human interface device indicates that an acknowledgement of receipt of the N-th input data is not required.

In example 34, the subject-matter of example 33 may further include for each k, 1≤k≤N, transmitting, by the human interface device, the first to k-th input data and the first to k-th control information associated with the first to k-th input data to the receiver device at the k-th predetermined time interval, and transmitting, by the receiver device, the k-th input data to the host device at the k-th predetermined time interval, or transmit, by the receiver device, the first to k-th input data to the host device at the N-th predetermined time interval.

In example 35, the subject-matter of example 33 may further include N is equal to 2 or 4 or any even integer.

While embodiments of the disclosure have been particularly shown and described with reference to specific embodiments, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced. It will be appreciated that common numerals, used in the relevant drawings, refer to components that serve a similar or the same purpose. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. A system for facilitating a data communication, the system comprising:
  a human interface device;
  a receiver device couplable to a host device and communicatively connectable to the human interface device, wherein the human interface device is configured to generate input data for a user input on the human interface device, generate control information associated with the input data, and transmit the input data and the control information to the receiver device at a predetermined time interval, wherein the control information indicates whether an acknowledgement of receipt of the input data is required, wherein the receiver device is configured to receive the input data and the control information from the human interface device and transmit the input data to the host device, and the receiver device is further configured to transmit an acknowledgement packet to the human interface device when the control information received from the human interface device indicates that an acknowledgement of receipt of the input data is required, and perform a background task when the control information received from the human interface device indicates that an acknowledgement of receipt of the input data is not required, wherein first to N-th predetermined time intervals are combined as a combined predetermined time interval, wherein at the first to (N-1)-th predetermined time intervals, first to (N-1)-th control information associated with first to (N-1)-th input data indicate that an acknowledgement of receipt of the first to (N-1)-th input data is not required from the receiver, and wherein at the N-th predetermined time interval, the receiver device is configured to transmit an acknowledgement packet to the human interface device when N-th control information associated with N-th input data indicates that an acknowledgement of receipt of the N-th input data is required, and perform a background task when the N-th control information received from the human interface device indicates that an acknowledgement of receipt of the N-th input data is not required.

2. The system according to claim 1, wherein the receiver device is configured to receive control data for controlling the human interface device from the host device, and wherein when the control information received from the human interface device indicates that an acknowledgement of receipt of the input data is required, the receiver device is configured to transmit the control data with the acknowledgement packet to the human interface device.

3. The system according to claim 1, wherein the receiver device is configured to receive control data for controlling the human interface device from the host device, and wherein if a size of the control data exceeds a predetermined size, the receiver device is configured to inform the human interface device of the control data at the predetermined time interval, and wherein the human interface device is configured to extend the predetermined time interval, so as to enable the receiver device to transmit the control data exceeding the predetermined size to the human interface device during the extended time interval.

4. The system according to claim 3, wherein the human interface device is further configured to return from the extended time interval to the predetermined time interval, after receiving the control data exceeding the predetermined size.

5. The system according to claim 2, wherein the receiver device is configured to split the control data into a plurality of groups of the control data, and sequentially transmit each group of the plurality of groups of the control data to the human interface device.

6. The system according to claim 5, wherein the human interface device includes a plurality of light sources, and each light source of the plurality of light sources is capable of selectively producing a plurality of lighting colours, and wherein the control data includes data for controlling the each light source to produce at least one predetermined lighting colour among the plurality of lighting colours.

7. The system according to claim 1, wherein when the control information received from the human interface device indicates that an acknowledgement of receipt of the input data is not required, the receiver device is configured to perform one of scanning one or more available channels and broadcasting a signal about an identity of the receiver device.

8. The system according to claim 7, wherein the receiver device is configured to perform scanning the one or more available channels in a vicinity of the receiver device, detect radio energy of the one or more available channels, compute an average of the detected radio energy, and select a channel based on the computed average.

9. The system according to claim 7 further comprising another receiver device, wherein the another receiver device is configured to detect the receiver device by the broadcasted signal, and transmit a command for disconnecting the receiver device from the human interface device to the receiver device, and wherein the receiver device is configured to receive the command and disconnect from the human interface device.

10. The system according to claim 9, wherein after the receiver device disconnects from the human interface device, the another receiver device is configured to establish a new wireless connection with the human interface device.

11. The system according to claim 7 further comprising another human interface device, wherein the another human interface device is configured to detect the receiver device by the broadcasted signal, and transmit a command for a request for a connection to the receiver device, and wherein the receiver device is configured to receive the command and disconnect from the human interface device.

12. The system according to claim 11, wherein after the receiver device disconnects from the human interface device, the receiver device is configured to establish a new wireless connection with the another human interface device.

13. The system according to claim 1, wherein when the control information received from the human interface device indicates that an acknowledgement of receipt of the input data is not required, the human interface device is configured to operate in a power saving mode.

14. The system according to claim 1, wherein the predetermined time interval is 125 ps and consequently a polling rate of the human interface device is 8000 Hz.

15. The system according to claim 1, wherein for each k, $1 \leq k \leq N$, the human interface device is configured to transmit the first to k-th input data and the first to k-th control information associated with the first to k-th input data to the receiver device at the k-th predetermined time interval, and wherein the receiver device is configured to transmit the k-th input data to the host device at the k-th predetermined time interval, or wherein the receiver device is configured to transmit the first to k-th input data to the host device at the N-th predetermined time interval.

16. The system according to claim 1, wherein N is equal to 2 or 4 or any even integer.

17. A method for facilitating a data communication, the method comprising:

generating, by a human interface device, input data for a user input on the human interface device;

generating, by the human interface device, control information associated with the input data, wherein the control information indicates whether an acknowledgement of receipt of the input data is required;

transmitting the input data and the control information from the human interface device to a receiver device at a predetermined time interval, wherein the receiver device is communicatively connected to the human interface device; and transmitting an acknowledgement packet from the receiver device to the human interface device, when the control information received from the human interface device indicates that an acknowledgement of receipt of the input data is required, and performing, by the receiver device, a background task, when the control information received from the human interface device indicates that an acknowledgement of receipt of the input data is not required, wherein first to N-th predetermined time intervals are combined as a combined predetermined time interval, and wherein at the first to (N-1)-th predetermined time intervals, first to (N-1)-th control information associated with first to (N-1)-th input data indicate that an acknowledgement of receipt of the first to (N-1)-th input data is not required from the receiver, the method further comprising:

at the N-th predetermined time interval, transmitting, by the receiver device, an acknowledgement packet to the human interface device when N-th control information associated with N-th input data indicates that an acknowledgement of receipt of the N-th input data is required, and performing a background task when the N-th control information received from the human interface device indicates that an acknowledgement of receipt of the N-th input data is not required.

18. The method according to claim 17, further comprising:

receiving, by the receiver device, control data for controlling the human interface device from a host device, and transmitting the control data with the acknowledgement packet to the human interface device, wherein when the control information received from the human interface device indicates that an acknowledgement of receipt of the input data is required.

19. The method according to claim 17, further comprising: receiving, by the receiver device, control data for controlling the human interface device from the host device; if a size of the control data exceeds a predetermined size, informing, by the receiver device, the human interface device of the control data at the predetermined time interval; and extending, by the human interface device, the predetermined time interval, so as to enable th receiver device to transmit the control data exceeding the predetermined size to the human interface device during the extended time interval.

20. The method according to claim 19, further comprising:

returning, by the human interface device, from the extended time interval to the predetermined time interval, after receiving the control data exceeding the predetermined size.

21. The method according to claim 18, further comprising:

splitting, by the receiver device, the control data into a plurality of groups of the control data; and sequentially transmitting each group of the plurality of groups of the control data from the receiver device to the human interface device.

22. The method according to claim 17, further comprising:

if the control information received from the human interface device indicates that an acknowledgement of receipt of the input data is not required, performing, by the receiver device, one of scanning one or more available channels and broadcasting a signal about an identity of the receiver device.

23. The method according to claim 22, further comprising:

performing, by the receiver device, scanning the one or more available channels in a vicinity of the receiver device;

detecting, by the receiver device, radio energy of the one or more available channels;

computing, by the receiver device, an average of the detected radio energy; and selecting, by the receiver device, a channel based on the computed average.

24. The method according to claim 22, further comprising:

detecting, by another receiver device, the receiver device by the broadcasted signal;

transmitting, by the another receiver device, a command for disconnecting the receiver device from the human interface device to the receiver device; and disconnecting the receiver device from the human interface device.

25. The method according to claim 24, further comprising:

after the receiver device disconnects from the human interface device, establishing the new wireless connection between the human interface device and the another receiver device.

26. The method according to claim 22, further comprising:

detecting, by another human interface device, the receiver device by the broadcasted signal;

transmitting, by the another human interface device, a command for a request for a connection to the receiver device; and disconnecting the receiver device from the human interface device.

27. The method according to claim 26, further comprising:

after the receiver device disconnects from the human interface device, establishing the new wireless connection between the receiver device and the new human interface device.

28. The method according to claim 17, further comprising:

if the control information received from the human interface device indicates that an acknowledgement of receipt of the input data is not required, controlling the human interface device to operate in a power saving mode.

29. The method according to claim 17, wherein the predetermined time interval is 125 μs and consequently a polling rate of the human interface device is 8000 Hz.

30. The method according to claim 17, further comprising:

for each k, 1≤k≤N, transmitting, by the human interface device, the first to k-th input data and the first to k-th control information associated with the first to k-th input data to the receiver device at the k-th predetermined time interval, and transmitting, by the receiver device, the k-th input data to the host device at the k-th predetermined time interval, or transmit, by the receiver device, the first to k-th input data to the host device at the N-th predetermined time interval.

31. The method according to claim 17, wherein N is equal to 2 or 4 or any even integer.

* * * * *